United States Patent
Bruce et al.

(10) Patent No.: US 7,707,143 B2
(45) Date of Patent: Apr. 27, 2010

(54) SYSTEMS, METHODS, AND COMPUTER PROGRAM PRODUCTS THAT AUTOMATICALLY DISCOVER METADATA OBJECTS AND GENERATE MULTIDIMENSIONAL MODELS

(75) Inventors: Jay M. Bruce, San Jose, CA (US); Marlene L. Coates, Hayward, CA (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 10/867,970

(22) Filed: Jun. 14, 2004

(65) Prior Publication Data
US 2005/0278290 A1 Dec. 15, 2005

(51) Int. Cl.
*G06F 17/30* (2006.01)
(52) U.S. Cl. .............................. 707/3; 707/6; 707/100; 707/1
(58) Field of Classification Search .................. None
See application file for complete search history.

(56) References Cited

U.S. PATENT DOCUMENTS

| | | |
|---|---|---|
| 5,537,524 A | 7/1996 | Aprile |
| 5,594,897 A * | 1/1997 | Goffman .................... 707/102 |
| 5,692,107 A | 11/1997 | Simoudis et al. |
| 5,692,175 A * | 11/1997 | Davies et al. .................. 707/3 |
| 5,748,188 A | 5/1998 | Hu et al. |
| 5,767,854 A | 6/1998 | Anwar |
| 5,832,475 A | 11/1998 | Agrawal et al. |
| 5,832,496 A | 11/1998 | Anand et al. |
| 5,870,746 A | 2/1999 | Knutson et al. |
| 5,905,985 A | 5/1999 | Malloy et al. |
| 5,918,232 A | 6/1999 | Pouschine et al. |
| 5,926,815 A | 7/1999 | James, III |

(Continued)

FOREIGN PATENT DOCUMENTS

JP 09106331 4/1997

(Continued)

OTHER PUBLICATIONS

Oracle9i OLAP Services Concepts and Administration Guide, Release 9.0.1, Jun. 2001, Oracle® Corporation.*

(Continued)

*Primary Examiner*—Neveen Abel Jalil
*Assistant Examiner*—Christyann R Pulliam
(74) *Attorney, Agent, or Firm*—Janaki K. Davda; Konrad Raynes & Victor LLP

(57) ABSTRACT

Systems, methods, and computer products that include an automated discovery process that discovers useful metadata objects from an intelligent starting point thereby generating at least one multidimensional model for OLAP analysis. Further, generation of the intelligent starting point may be derived by use of a multidimensional analysis program that analyzes the results of query mining and query analysis. The preferred embodiment of the present invention determines whether metadata useful for OLAP analysis exists by evaluating patterns found in the queries. In addition to using the starting point derived from the results of query mining and query analysis, the preferred embodiment of the present invention may also limit search parameters to narrow the scope of searching for an intelligent starting point and thereby both increase the probability of producing an accurate cube multidimensional model and increase the efficiency of determining the intelligent starting point.

24 Claims, 9 Drawing Sheets

U.S. PATENT DOCUMENTS

| | | | |
|---|---|---|---|
| 5,926,818 A | 7/1999 | Malloy | |
| 5,943,668 A | 8/1999 | Malloy et al. | |
| 5,960,423 A | 9/1999 | Chaudhuri et al. | |
| 5,978,788 A | 11/1999 | Castelli et al. | |
| 5,991,754 A | 11/1999 | Raitto et al. | |
| 6,003,024 A | 12/1999 | Bair et al. | |
| 6,003,036 A | 12/1999 | Martin | |
| 6,031,977 A | 2/2000 | Pettus | |
| 6,092,064 A | 7/2000 | Aggarwal et al. | |
| 6,115,547 A | 9/2000 | Ghatate et al. | |
| 6,122,636 A | 9/2000 | Malloy et al. | |
| 6,134,532 A * | 10/2000 | Lazarus et al. | 705/14 |
| 6,144,962 A | 11/2000 | Weinberg et al. | |
| 6,175,836 B1 | 1/2001 | Aldred | |
| 6,205,447 B1 | 3/2001 | Malloy | |
| 6,226,647 B1 * | 5/2001 | Venkatasubramanian et al. | 707/102 |
| 6,249,791 B1 * | 6/2001 | Osborn et al. | 707/200 |
| 6,292,797 B1 | 9/2001 | Tuzhilin et al. | |
| 6,308,168 B1 | 10/2001 | Dovich et al. | |
| 6,317,750 B1 | 11/2001 | Tortolani et al. | |
| 6,324,533 B1 | 11/2001 | Agrawal et al. | |
| 6,327,574 B1 | 12/2001 | Kramer et al. | |
| 6,339,776 B2 | 1/2002 | Dayani-Fard et al. | |
| 6,362,823 B1 | 3/2002 | Johnson et al. | |
| 6,366,903 B1 | 4/2002 | Agrawal et al. | |
| 6,374,234 B1 | 4/2002 | Netz | |
| 6,385,604 B1 | 5/2002 | Bakalash et al. | |
| 6,385,609 B1 | 5/2002 | Barshefsky et al. | |
| 6,408,292 B1 | 6/2002 | Bakalash et al. | |
| 6,418,428 B1 * | 7/2002 | Bosch et al. | 707/3 |
| 6,421,665 B1 * | 7/2002 | Brye et al. | 707/3 |
| 6,438,537 B1 | 8/2002 | Netz et al. | |
| 6,449,609 B1 | 9/2002 | Witkowski | |
| 6,477,536 B1 * | 11/2002 | Pasumansky et al. | 707/102 |
| 6,480,836 B1 | 11/2002 | Colby et al. | |
| 6,484,179 B1 | 11/2002 | Roccaforte | |
| 6,539,371 B1 | 3/2003 | Bleizeffer et al. | 707/2 |
| 6,542,895 B1 | 4/2003 | DeKimpe et al. | |
| 6,546,381 B1 | 4/2003 | Subramanian et al. | |
| 6,546,395 B1 | 4/2003 | DeKimpe et al. | |
| 6,567,796 B1 | 5/2003 | Yost et al. | |
| 6,574,619 B1 | 6/2003 | Reddy et al. | |
| 6,574,791 B1 | 6/2003 | Gauthier et al. | 717/107 |
| 6,581,054 B1 * | 6/2003 | Bogrett | 707/4 |
| 6,581,068 B1 | 6/2003 | Bensoussan et al. | |
| 6,604,110 B1 | 8/2003 | Savage et al. | |
| 6,609,123 B1 * | 8/2003 | Cazemier et al. | 707/4 |
| 6,615,201 B1 | 9/2003 | Seshadri et al. | 707/2 |
| 6,628,312 B1 | 9/2003 | Rao et al. | |
| 6,633,882 B1 | 10/2003 | Fayyad et al. | |
| 6,633,885 B1 | 10/2003 | Agrawal et al. | |
| 6,636,845 B2 | 10/2003 | Chau et al. | |
| 6,636,853 B1 | 10/2003 | Stephens, Jr. | |
| 6,643,633 B2 | 11/2003 | Chau et al. | |
| 6,643,661 B2 | 11/2003 | Polizzi et al. | |
| 6,651,055 B1 | 11/2003 | Kilmer et al. | |
| 6,654,764 B2 | 11/2003 | Kelkar et al. | |
| 6,665,682 B1 | 12/2003 | DeKimpe et al. | |
| 6,671,689 B2 * | 12/2003 | Papierniak | 707/100 |
| 6,681,223 B1 | 1/2004 | Sundaresan | |
| 6,684,207 B1 | 1/2004 | Greenfield et al. | |
| 6,694,322 B2 | 2/2004 | Warren et al. | |
| 6,697,808 B1 * | 2/2004 | Hurwood et al. | 707/10 |
| 6,707,454 B1 | 3/2004 | Barg et al. | |
| 6,711,579 B2 | 3/2004 | Balakrishnan | |
| 6,711,585 B1 | 3/2004 | Copperman et al. | |
| 6,714,940 B2 | 3/2004 | Kelkar | |
| 6,768,986 B2 | 7/2004 | Cras et al. | |
| 6,775,662 B1 | 8/2004 | Witkowski et al. | |
| 6,801,992 B2 | 10/2004 | Gajjar et al. | |
| 6,823,334 B2 * | 11/2004 | Vishnubhotla et al. | 707/3 |
| 6,831,668 B2 * | 12/2004 | Cras et al. | 715/853 |
| 6,842,758 B1 * | 1/2005 | Bogrett | 707/103 R |
| 6,865,573 B1 * | 3/2005 | Hornick et al. | 707/6 |
| 6,871,140 B1 | 3/2005 | Florance et al. | |
| 6,898,603 B1 * | 5/2005 | Petculescu et al. | 707/3 |
| 6,931,418 B1 * | 8/2005 | Barnes | 707/103 R |
| 6,947,929 B2 * | 9/2005 | Bruce et al. | 707/5 |
| 6,957,225 B1 * | 10/2005 | Zait et al. | 707/102 |
| 6,996,556 B2 * | 2/2006 | Boger et al. | 707/3 |
| 7,007,039 B2 | 2/2006 | Chaudhuri et al. | |
| 7,051,038 B1 | 5/2006 | Yeh et al. | |
| 7,139,764 B2 * | 11/2006 | Lee | 707/100 |
| 7,149,983 B1 * | 12/2006 | Robertson et al. | 715/810 |
| 7,162,464 B1 * | 1/2007 | Miller et al. | 706/50 |
| 7,181,450 B2 * | 2/2007 | Malloy et al. | 707/4 |
| 7,188,090 B2 * | 3/2007 | Kim et al. | 706/11 |
| 7,191,169 B1 * | 3/2007 | Tao | 707/2 |
| 7,203,671 B1 * | 4/2007 | Wong | 707/2 |
| 7,246,116 B2 * | 7/2007 | Barsness et al. | 707/3 |
| 7,266,565 B2 * | 9/2007 | Diab | 707/102 |
| 7,275,024 B2 * | 9/2007 | Yeh et al. | 703/2 |
| 7,346,601 B2 * | 3/2008 | Chaudhuri et al. | 707/2 |
| 7,430,562 B1 * | 9/2008 | Bedell et al. | 707/102 |
| 7,447,687 B2 * | 11/2008 | Andersch et al. | 707/5 |
| 7,472,127 B2 * | 12/2008 | Malloy et al. | 707/100 |
| 7,480,663 B2 | 1/2009 | Colossi et al. | |
| 2001/0026276 A1 | 10/2001 | Sakamoto et al. | |
| 2001/0037228 A1 | 11/2001 | Ito et al. | |
| 2001/0037327 A1 | 11/2001 | Haas et al. | |
| 2001/0047355 A1 | 11/2001 | Anwar | |
| 2001/0047364 A1 | 11/2001 | Proctor | |
| 2001/0051947 A1 | 12/2001 | Morimoto et al. | |
| 2001/0055018 A1 | 12/2001 | Yaginuma et al. | |
| 2002/0002469 A1 | 1/2002 | Hillstrom | |
| 2002/0029207 A1 | 3/2002 | Bakalash et al. | |
| 2002/0073088 A1 | 6/2002 | Beckmann et al. | 707/10 |
| 2002/0078039 A1 | 6/2002 | Cereghini et al. | 707/4 |
| 2002/0087516 A1 * | 7/2002 | Cras et al. | 707/2 |
| 2002/0091679 A1 | 7/2002 | Wright | 707/3 |
| 2002/0091681 A1 | 7/2002 | Cras et al. | |
| 2002/0095430 A1 | 7/2002 | Egilsson et al. | |
| 2002/0122078 A1 | 9/2002 | Markowski | |
| 2002/0123993 A1 | 9/2002 | Chau et al. | |
| 2002/0124002 A1 | 9/2002 | Su et al. | |
| 2002/0129003 A1 | 9/2002 | Bakalash et al. | |
| 2002/0129032 A1 | 9/2002 | Bakalash et al. | |
| 2002/0138316 A1 * | 9/2002 | Katz et al. | 705/7 |
| 2002/0143783 A1 * | 10/2002 | Bakalash et al. | 707/100 |
| 2002/0188587 A1 | 12/2002 | McGreevy | |
| 2002/0188599 A1 | 12/2002 | McGreevy | |
| 2003/0004914 A1 | 1/2003 | McGreevy | |
| 2003/0004942 A1 * | 1/2003 | Bird | 707/3 |
| 2003/0014397 A1 | 1/2003 | Chau et al. | |
| 2003/0033277 A1 | 2/2003 | Bahulkar et al. | |
| 2003/0055813 A1 * | 3/2003 | Chaudhuri et al. | 707/3 |
| 2003/0055832 A1 | 3/2003 | Roccaforte | 707/100 |
| 2003/0061207 A1 | 3/2003 | Spektor | 707/3 |
| 2003/0071814 A1 | 4/2003 | Jou et al. | 345/440 |
| 2003/0078852 A1 | 4/2003 | Shoen et al. | |
| 2003/0078913 A1 | 4/2003 | McGreevy | |
| 2003/0081002 A1 | 5/2003 | De Vorchik et al. | 345/762 |
| 2003/0093424 A1 | 5/2003 | Chun et al. | 707/7 |
| 2003/0101202 A1 | 5/2003 | Kelkar et al. | 707/201 |
| 2003/0115183 A1 | 6/2003 | Abdo et al. | |
| 2003/0115207 A1 | 6/2003 | Bowman et al. | |
| 2003/0126144 A1 | 7/2003 | O'Halloran et al. | 707/100 |
| 2003/0184588 A1 | 10/2003 | Lee | |
| 2003/0206201 A1 | 11/2003 | Ly | |
| 2003/0212667 A1 * | 11/2003 | Andersch et al. | 707/3 |
| 2003/0212676 A1 | 11/2003 | Bruce et al. | 707/5 |
| 2003/0225768 A1 | 12/2003 | Chaudhuri et al. | |
| 2004/0006574 A1 | 1/2004 | Witkowski et al. | |

| | | |
|---|---|---|
| 2004/0010505 A1* | 1/2004 | Vishnubhotla ............... 707/100 |
| 2004/0059705 A1 | 3/2004 | Wittke et al. |
| 2004/0098415 A1* | 5/2004 | Bone et al. .................. 707/200 |
| 2004/0122646 A1* | 6/2004 | Colossi et al. ................ 703/22 |
| 2004/0122844 A1* | 6/2004 | Malloy et al. ............... 707/102 |
| 2004/0128287 A1 | 7/2004 | Keller et al. |
| 2004/0128314 A1 | 7/2004 | Katibah et al. |
| 2004/0139061 A1* | 7/2004 | Colossi et al. ................. 707/3 |
| 2004/0181502 A1* | 9/2004 | Yeh et al. ....................... 707/1 |
| 2004/0181538 A1* | 9/2004 | Lo et al. ...................... 707/100 |
| 2004/0215626 A1* | 10/2004 | Colossi et al. .............. 707/100 |
| 2004/0267774 A1 | 12/2004 | Lin et al. |
| 2005/0027754 A1 | 2/2005 | Gajjar et al. |
| 2005/0033730 A1 | 2/2005 | Chaudhuri et al. |
| 2005/0267868 A1 | 12/2005 | Liebl et al. |
| 2005/0283494 A1 | 12/2005 | Colossi et al. |
| 2008/0133582 A1 | 6/2008 | Andersch et al. |

FOREIGN PATENT DOCUMENTS

| | | |
|---|---|---|
| JP | 09146962 | 6/1997 |
| JP | 10247197 | 9/1998 |
| JP | 2001243242 | 9/2001 |
| JP | 2001243244 | 9/2001 |
| JP | 20027435 | 1/2002 |
| JP | 2002007435 | 1/2002 |
| JP | 2002123530 | 4/2002 |
| WO | 0022493 | 4/2000 |
| WO | 0129690 | 4/2000 |
| WO | WO0022493 | 4/2000 |
| WO | 0065479 | 11/2000 |
| WO | 0072165 | 11/2000 |
| WO | WO0065479 | 11/2000 |
| WO | 0109768 | 2/2001 |
| WO | WO0129690 | 4/2001 |

OTHER PUBLICATIONS

Query Optimization in Oracle9i, an Oracle White Paper, Feb. 2002, Oracle®.*
DB2 Magazine. Quarter 1, 2004 vol. 9, Issue 1. Seeing Is Believing. By Michael H. Alcorn. An Internet media company puts DB2 Cube Views through its paces at an IBM Business Intelligence Teraplex Center.*
Chater 4: Discovering the Available Metadata. Oracle OLAP Developer's Guide to OLAP API. Oracle website.Copyright 2003.*
Model-Driven Architecture: Visison, Standards, and Emerging Technologies. John D. Poole. Apr. 2001.*
Oracle OLAP Analytic Workspace Java API Reference 10g Release 1 (10.1). Copyright 2003.*
Frederic Andres et al. Metadata Model, Resource Discovery, and Querying on Large Scale Multidimensional Datasets. The GEREQ Project. IEEE 2001.*
Colossi, Malloy, and Reinwald. Relational extensions for OLAP. IBM 2002.*
Multi-Dimensional Modeling with BW. ASAP for BW Accelerator. SAP America white paper. Copyright 2000.*
Thanh N. Huynh et al. Metadata for Object-Relational Data Warehouse. DMDW' Jun. 5-6, 2000.*
John Poelman. How to Build a Metadata Bridge for DB2 Cube Views. Copyright IBM. May 22, 2003.*
Craig S. Mullins Articles. DB2 Information Infrastructure. 4Q2003. Introduces QMF.*
Improving the Processing of Decision Support Queries: The Case for a DSS Optimizer □□H Schwarz, R Wagner, B Mitschang—2001 International Database Engineering & Applications Symposium (IDEAS '01) p. 0177.*
CubiST++: Evaluating Ad-Hoc CUBE Queries Using Statistics Trees. Distributed and Parallel Databases. vol. 14, No. 3 / Nov. 2003. Joachim Hammer and Lixin Fu (authors).*
Master Thessis by Qing Chen Jul. 1999. Mining Exceptions and Quantitative Association Rules in OLAP Data Cube.*

Understanding How Metadata and Explanations Can Better Support Data Warehousing□□and Related Decision Support Systems: An Exploratory Case Study, by Traci J. Hess and John D. Wells. IEEE 2002.*
Rhys Morgan. Web-based Interactive Database Query Builder. University of Bristol. Dissertation for Masters of Science. Sep. 2002.*
IBM DB2 Information Integrator V8.1 Software Announcement May 20, 2003.*
The IBM Business Intelligence Software Solution. Prepared for IBM. By Colin J. While. Version 3, Mar. 1999.*
DB2 Newsletter-Jun. 2003. Compiled by Judson Howard.*
Kamber, Micheline et al., Metarule Guided Mining of Multi-Dimensional Association Rules Using Data Cubes, KDD-97 Proceedings, AAAI, pp. 207-210, 1997.*
Han, Jaiwei et al., Generalization-based data mining in object-oriented databases using an object cube model, Data & Knowledge Engineering 25 (1998) 55-97.*
Stefanovic, Nebojsa et al., Object-Based Selective Materialization for Efficient Implementation of Spatial Data Cubes, IEEE Transactions on knowledge and Data Engineering vol. 12. No. 6 Nov./Dec. 2000, 938-958.*
DeKimpe et al., *System and Method for Automatically Building an OLAP Model in a Relational Database*, U.S. Appl. No. 10/325,245, filed Dec. 18, 2002.
IBM United States, *IBM QMF for Windows for DB2 Workstation Databases, V7.2—Business Intelligence Starts Here!*, Software Announcement, Feb. 26, 2002.
NPL Documents, Goll_et_al_A_Parallel_Scalable_Infrastructure_.pdf, 838409, No. 10.
NPL Documents, Hedberg_Parallelism_Speeds_Data_Mining.pdf, 352896, No. 4.
NPL Documents, Oracle9i_OLAP_Services_Concepts_and Admin_Guide.pdf, 5159182, No. 126.
NPL Documents, Pedersen_at_al_A_Powerful_and_SQL_Compatible_pdf, 991654, No. 10.
NPL Documents, Pires_et _al_Database_Query_Optimizer_.pdf, 1326773, No. 16.
NPL Documents, Albrecht_et_al_Query_Optimization_by_Using_.pdf, 751568, No. 8.
NPL Documents, QMF_HighPerformance_Option_.pdf, 1143536, No. 355.
NPL Documents, Query_Optimization_in_OracIe9i.pdf, 1932134, No. 30.
NPL Documents, Shukla_el_al_Materialized_View_Selection_.pdf, 941781, No. 12.
NPL Documents, Toyama_Super_SQL_An_Extended_SQL_.pdf, 370170, No. 6.
NPL Documents, US_Appln_No_09602490.pdf, 1434915, No. 48.
NPL Documents, Warshaw_et_al_Rule_Based_Query_.pdf, 872833, No. 10.
Transmittal to TC, Transmittal_1449_2.pdf, 63798, No. 2.
Information Disclosure Statement (IDS) Filed, 1449_2.pdf, 1177802, No. 9.
Albrecht, et al. "Query Optimization by Using Derivability in a Data Warehouse Environment," DOLAP '00, Nov. 2000 McLean, VA, USA; pp. 49-56.
Goil, et al. "A Parallel Scalable Infrastructure for OLAP and Data Mining," Northwestern University, undated and unattributed document; 9 pp.
Hedbert, S. R., "Parallelism Speeds Data Mining," IEEE Parallel & Distributed Technology, Winter 1995; pp. 3-8.
Lumpkin, et al. "Query Optimization in Oracle9i," Oracle White Paper, Feb. 2002; 30 pp.
Oracle9i OLAP Services: Concepts and Administration Guide, Release 1 (9.0.1), Jun. 2001, A66755-01, Oracle Corp.; pp. i through Index-6.
Pedersen, et al. "A Powerful and SQL-Compatible Data Model and Query Language for OLAP," 13th Australasian Database Conference (ADC2002), Conferences in Research & Practice in Information Technology, vol. 5, Australian Computer Society, Inc., 2001; pp. 121-130.

Pires, et al., "Databse Query Optimizer with Rule Based Search Engine". SugerloafPLoP 2002 Proceedings, pp. 5-20.

QMF High Performance Option User's Guide for z/OS and OS/390, IBM Query Management Facility, Version 7 Release 2, SC27-0724-01, 2nd ed. Mar. 2002; pp. i-x and 1-338.

Toyama, M, "SuperSQL: An Extended SQL for Database Publishing and Presentation," Proc. 1998 ACM SIGMOD, Jun. 1-4, 1998, vol. 27, No. 2; 6 pp.

U.S. Appl. No. 09/602,490, filed Jun. 23, 2000; Kraft, et al; 47 pp.

Warshaw, et al. "Rule-Based Query Optimization, Revisited," 8th Intl. Conf. Information Knowledge Management CIKM'99; Nov. 2-5, 1999: pp. 267-275.

Shukla, et al., "Materialized View Selection for Multi-cube Data Models", Proceedings of the 7th International Conference on Extending Database Technology, Mar. 2000, pp. 269-284.

Rudensteiner, E.A., A. Koeller, and X. Zhang, "Maintaining Data Warehouses Over Changing Information Sources", Communications of the ACM, Jun. 2000, vol. 43, No. 6, pp. 57-62.

Shah, K. and A. Sheth, "InfoHarness: Managing Distributed, Heterogeneous Information" IEEE Internet Computing, Nov.-Dec. 1999, vol. 3, Iss. 6, pp. 18-28.

Systems, methods, and computer program products that automatically discover metadata objects and generate multidimensional models.

Janaki K. Davda Filer Authorized by:.

Utility International Application Number:.

Amendment, Nov. 24, 2004, for International Application No. PCT/GB03/005490, 4 pp.

Amendment, Mar. 31, 2005, for International Application No. PCT/GB03/005490, 3 pp.

Bird, C.L. and S.G. Chapman, "Viewing Data Within a Three-Dimensional Space by Two-Dimensional Devices", IBM TDB, vol. 34, No. 12, May 1992, pp. 83-84.

Bito, Y., R. Kero, H. Matsuo, Y. Shintani, and M. Silver, "Interactively Visualizing Data Warehouses", Journal of Healthcare Information Management, vol. 15, No. 2, 2001, pp. 133-142.

Cheung, D.W., B. Zhou, B. Kao, H. Lu, T.W. Lam, and H.F. Ting, "Requirement-Based Data Cube Schema Design", Proceedings of the Eighth International Conference on Information and Knowledge Management, 1999, pp. 162-169.

Cheung, D.W., B. Zhou, B. Kao, H. Kan, and S.D. Lee, "Towards the Building of a Dense-Region-Based OLAP System", Data & Knowledge Engineering, vol. 36, Issue 1, Jan. 2001, 27 pp.

Colliat, G., "OLAP, Relational, and Multidimensional Database Systems", Sigmod Record, vol. 25, No. 3, Sep. 1996, pp. 64-69.

E.F. Codd Associates, "Providing OLAP to User-Analysts: An IT Mandate", [online] 1998, [retrieved on Oct. 8, 2002], retrieved from the Internet at <URL: http://www.hyperion.com/downloads/olap_to_useranalysts_wp.pdf>, pp. 1-22.

Eick, S.G., "New Visualization Techniques", SIGGRAPH Computer Graphics Newsletter, vol. 34, No. 1, [online] Feb. 2000, [retrieved on Apr. 8, 2004], retrieved from the Internet at <URK: http://www.siggraph.org/publications/newsletter/v34n1/contributions/Eick.html>, 11 pp.

Final Office Action 1, Jan. 5, 2006, for U.S. Appl. No. US10/323,131, 14 pp.

Final Office Action 1, Jan. 5, 2006, for U.S. Appl. No. US10/341,763, 18 pp.

Final Office Action 1, for Mar. 2, 2006, for U.S. Appl. No. US10/410,793, 22 pp.

Final Office Action 1, Oct. 4, 2007, for U.S. Appl. No. US10/874,398, 32 pp.

Final Office Action 2, Nov. 1, 2006, for U.S. Appl. No. US10/341,763, 24 pp.

Final Office Action 2, Mar. 27, 2007, for U.S. Appl. No. US10/410,793, 23 pp.

Final Office Action 3, Apr. 24, 2008, for U.S. Appl. No. US10/410,793, 19 pp.

Goil, S., and A. Choudhary, "High Performance Multidimensional Analysis of Large Datasets", Proceedings of the 1st ACM International Workshop on Data Warehousing and OLAP, 1998, pp. 34-39.

Gray, J., S. Chaudhuri, A. Bosworth, A. Layman, D. Reichart, M. Venkatrao, F. Pellow, and H. Pirahesh, "Data Cube: A Relational Aggregation Operator Generalizing Group-By, Cross-Tab, and Sub-Totals", Data Mining and Knowledge Discovery 1, 1997, pp. 29-53.

International Preliminary Examination Report, Apr. 11, 2005, for International Application No. PCT/GB03105490, 11 pp.

International Search Report, Apr. 16, 2004, for International Application No. PCT/GB03/05490, 5 pp.

Kenan Systems Corporation, "An Introduction to Multidimensional Database Technology", [online], 1995, [retrieved on Aug. 4, 2004], retrieved from the Internet at <URL: http://www.fing.edu.uy/inco/grupos/csi/esp/Cursos/cursos_act/2003DAP_SistDW/Material/ken96.pdf>, pp. 1-29.

Kotidis, Y. and N. Roussopoulos, "An Alternative Storage Organization for ROLAP Aggregate Views Based on Cubetrees", ACM Sigmod Record, vol. 27, Issue 2, Jun. 1998, pp. 249-258.

Mangisengi, O., A.M. Tjoa, and R.R. Wagner, "Metadata Management Concept for Multidimensional OLAP Data based on Object-Oriented Concepts", Proceedings of the First International Conference on Web Information Systems Engineering, 2000, vol. 1, pp. 358-365.

Maniatis, A.S., P. Vassiliadis, S. Skiadopoulos, and Y. Vassiliou, "Advanced Visualization for OLAP", Proceedings of the 6th ACM International Workshop on Data Warehousing and OLAP, Nov. 2003, pp. 9-16.

Microsoft Corp. and Hyperion Solutions Corp., "XML for Analysis Specification", Version 1.0, updated Apr. 24, 2001, 107 pp.

Nippl, C. and B. Mitschang, "Topaz: A Cost-Based, Rule-Driven, Multi-Phase Parallelizer", Proceedings of the 24th VLDB Conference, 1998, pp. 251-262.

Notice of Allowance 1, Nov. 4, 2005, for U.S. Appl. No. US10/144,347, 8 pp.

Notice of Allowance 1, Apr. 19, 2005, for U.S. Appl. No. US10/144,540, 11 pp.

Notice of Allowance 1, May 19, 2006, for U.S. Appl. No. US10/323,131, 9 pp.

Notice of Allowance 1, Aug. 22, 2006, for U.S. Appl. No. US10/325,245, 11 pp.

Notice of Allowance 1, Dec. 11, 2008, for U.S. Appl. No. US10/874,397, 17 pp.

Notice of Allowance 1, Sep. 3, 2008, for U.S. Appl. No. US10/874,398, 16 pp.

Notice of Allowance 2, Oct. 18, 2007, for U.S. Appl. No. US10/144,347, 13 pp.

Notice of Allowance 2, Sep. 20, 2006, for U.S. Appl.No. US10/323,131, 13 pp.

Notice of Allowance 2, Feb. 8, 2007, for U.S. Appl. No. US10/325,245, 8 pp.

Notice of Allowance 3, Jun. 25, 2008, for U.S. Appl. No. US10/144,347, 16 pp.

Notice of Allowance 3, Jan. 29, 2009, for U.S. Appl. No. US10/325,245, 11 pp.

Office Action 1, Sep. 24, 2004, for U.S. Appl.No. US10/144,347, 18 pp.

Office Action 1, Oct. 13, 2004, for U.S. Appl. No. US10/144,540, 15 pp.

Office Action 1, Jul. 5, 2005, for U.S. Appl. No. US10/323,131, 15 pp.

Office Action 1, Mar. 10, 2006, for U.S. Appl. No. US10/325,245, 9 pp.

Office Action 1, Jul. 21, 2005, for U.S. Appl. No. US10/341,763, 27 pp.

Office Action 1, Sep. 20, 2005, for U.S. Appl. No. US10/410,793, 26 pp.

Office Action 1, Mar. 14, 2007, for U.S. Appl. No. US10/874,397, 27 pp.

Office Action 1, Mar. 5, 2007, for U.S. Appl. No. US10/874,398, 33 pp.

Office Action 2, May 10, 2005, for U.S. Appl. No. US10/144,347, 14 pp.

Office Action 2, Oct. 4, 2007, for U.S. Appl. No. US10/874,397, 39 pp.
Office Action 3, Jul. 26, 2006, for U.S. Appl. No. US10/144,347, 8 pp.
Office Action 3, May 22, 2006, for U.S. Appl. No. US10/341,763, 15 pp.
Office Action 3, Sep. 19, 2006, for U.S. Appl. No. US10/410,793, 30 pp.
Office Action 3, Apr. 7, 2008, for U.S. Appl. No. US10/874,397, 26 pp.
Office Action 3, Mar. 3, 2008, for U.S. Appl. No. US10/874,398, 24 pp.
Office Action 4, Jan. 29, 2007, for U.S. Appl. No. US10/144,347, 12 pp.
Office Action 5, Jun. 27, 2007, for U.S. Appl. No. US10/144,347, 11 pp.
Office Action 5, Oct. 19, 2007, for U.S. Appl. No. US10/410,793, 18 pp.
Office Action 6, Aug. 20, 2008, for U.S. Appl. No. US10/410,793, 18 pp.
Pendse, N., "The OLAP Report: What is OLAP?", [online], Updated Jul. 27, 2002, [retrieved on Oct. 8, 2002], retrieved from the Internet at <URL: http://www.olapreport.com/fasmi>, 7 pp.
Pokorny, J. and P. Sokolowsky, "A Conceptual Modelling Perspective for Data Warehouses", [online], 1999, [retrieved on Apr. 8, 2004], retrieved from the Internet at <URL: http://wi99.iwi.uni-sb.de/teilnehmer/pdf-files/EF_32_WiB082.pdf>, 20 pp.
Post, L.L. and J.J. Sydir, "Dynamically Configurable User Interface for the Manipulation of Data Objects", IBM TDB, vol. 37, No. 3, Mar. 1994, pp. 23-30.
Rabenhorst, D.A., "Many-Dimensional Visualization Technique", IBM TDB, vol. 35, No. 6, Nov. 1992, pp. 473-475.
Rai, A. and V. Storey, "Data Mining Multidimensional Databases, OLAP (Online Analytical Processing), & Data Warehousing", [online] 2001, [retrieved on Apr. 8, 2004], retrieved from the Internet at <URL: http://www.cis.gsu.edu/-dstraub/JMBA/MBA8473/2001/DataMine3-2ups.pdf>, 40 pp.
Raphaely, D., "Oracle 8i Application Developers Guide- Fundamentals", Release 8.1.5, Part No. A68003-01, Feb. 1999, 24 pp.
Sapia, C., M. Blaschka, G. Hofling, and B. Dinter, "Extending the E/R Model for the Multidimensional Paradigm", Proceedings of the Workshops on Data Warehousing and Data Mining: Advances in Database Technologies, 1998, pp. 105-116.
Sifer, M., "A Visual Interface Technique for Exploring OLAP Data with Coordinated Dimension Hierarchies", Proceedings of the Twelfth International Conference on Information and Knowledge Management, Nov. 2003, pp. 532-535.
Stewert, H.M., "OLAP/EIS Tops Off the Data Warehouse", Proceedings of the 1995 Cause Annual Conference, 1995, pp. 1-16.
Stohr, T., R. Muller, and E. Rahm, "An Integrative and Uniform Model for Metadata Management in Data Warehousing Environments", Proceedings of the International Workshop on Design Management of Data Warehouses, 1999, 16 pp.
Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, 10 pp.
Supplemental NOA, Sep. 21, 2006, for U.S. Appl. No. US10/325,245, 11 pp.
Tang, D., C. Stolte, and R. Bosch, "Design Choices when Architecting Visualizations", Information Visualization, vol. 3, Iss. 2, 2004, 10 pp.
Vassiliadis, P., "Modeling Multidimensional Databases, Cubes and Cube Operations", Proceedings of the 10th International Conference on Scientific and Statistical Database Management, 1998, 10 pp.
W3C, "XML Path Language (XPath)", Version 1.0, [online], W3C Recommendation Nov. 16, 1999, [retrieved on Oct. 8, 2002], retrieved from the Internet at <URL: http://www.w3/prg/TR/xpath>, 37 pp.
Wolfram Research, Inc., "Hexagonal Prism", [online], 2004, [retrieved on Jun. 6, 2004], retrieved from the Internet at <URL: http://mathworld.wolfram.com/HexagonalPrism.html>, 2 pp.
Wolfram Research, Inc., "Polyhedron", [online], 2004, [retrieved on Jun. 6, 2004], retrieved from the Internet at <URL: http://mathworld.wolfram.com/Polyhedron.html>, 5 pp.
Wolfram Research, Inc., "Prism", [online], 2004, [retrieved on Jun. 6, 2004], retrieved from the Internet at <URL: http://mathworld.wolfram.com/Prism.html>, 5 pp.
Wolfram Research, Inc., "Triangular Prism", [online], 2004, [retrieved on Jun. 6, 2004], retrieved from the Internet at <URL: http://mathworld.wolfram.com/TriangularPrism_html>, 2 pp.
Written Opinion, Sep. 6, 2004, for International Application No. PCT/GB03/05490, 7 pp.
Zhao, Y., P.M. Deshpande, J.F. Naughton, and A. Shukla, "Simultaneous Optimization and Evaluation of Multiple Dimensional Queries", ACM Sigmod Record, vol. 27, Iss. 2, Jun. 1998, pp. 271-282.
Zhou, B., "ScanChunk: An Efficient Algorithm for Hunting Dense Regions in Data Cube", Chines Journal of Computers, vol. 22, No. 6, Jun. 1999, pp. 620-626 [Abstract].
Amendment, Jun.12, 2006, for U.S. Appl. No. US10/325,245, 9 pp.
Abstract and Machine Translation for JP2001243244, published on Sep. 7, 2001, 46 pp.
Abstract and Machine Translation for JP2001243242, published on Sep. 7, 2001, 55 pp.
Abstract for JP2003500741, published Jan. 7, 2003, 1 pp [Abstract for corresponding case WO0072165].
Abstract for JP2003519418, published Jun. 17, 2003, 1 pp [Abstract for corresponding case WO0109768].
IDS Report, Jun. 16, 2009, from the Jun. 2, 2009 Office Action for JP2004-566154, 2 pp.
Japanese Office Action, Jun. 2, 2009, for Application No. JP2004-566154, 7 pp.
Japanese Office Action, Jun. 2, 2009, for Application No. JP2004-566154, 6 pp [Translation].
Notice of Allowance 2, May 29, 2009, for U.S. Appl. No. US10/874,397, 10 pp.
Office Action 7, Feb. 12, 2009, for U.S. Appl. No. US10/410,793, 17 pp.

* cited by examiner

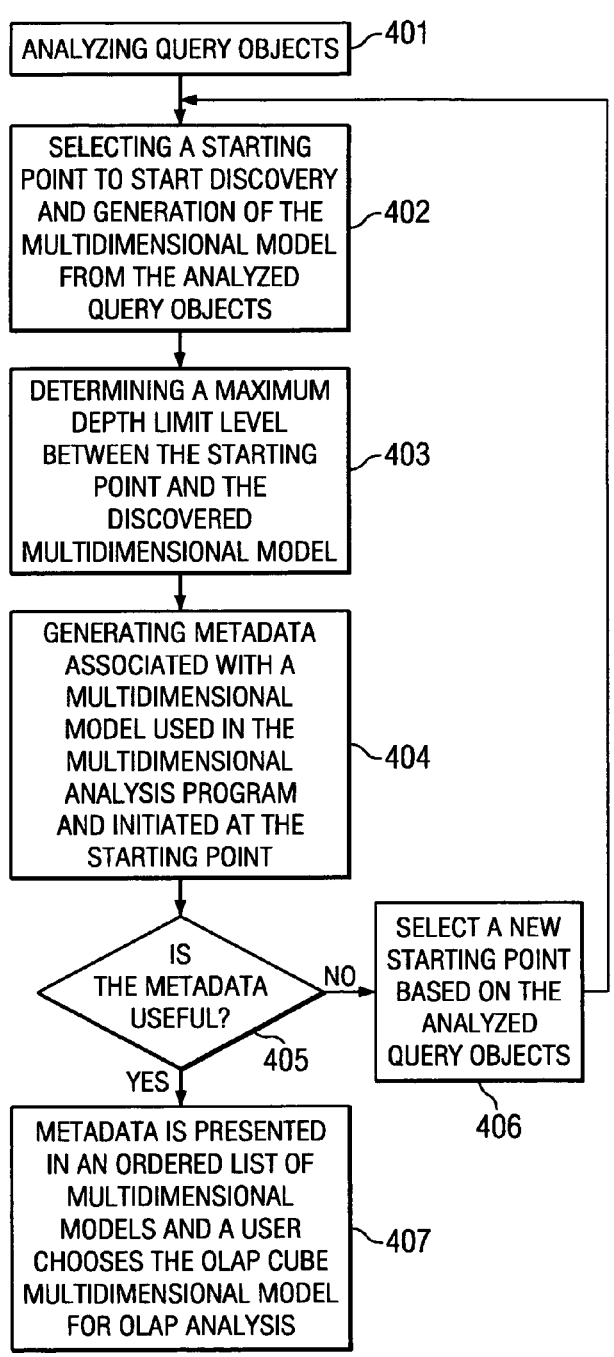
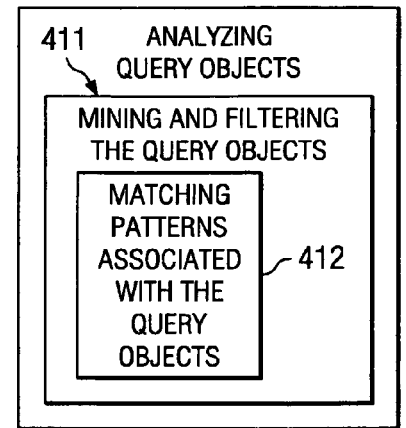
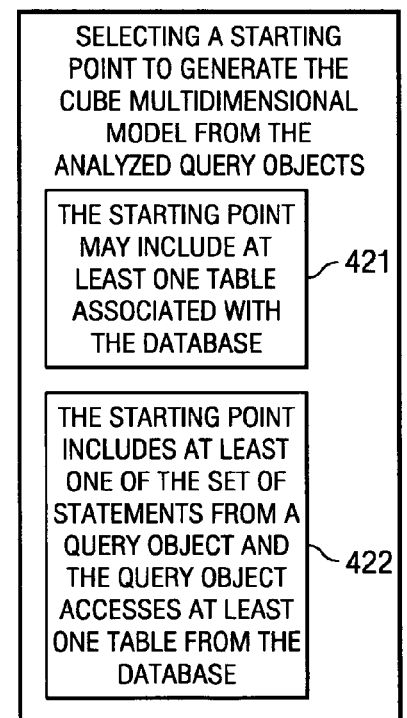
FIG. 4A
FIG. 4B
FIG. 4C
FIG. 5

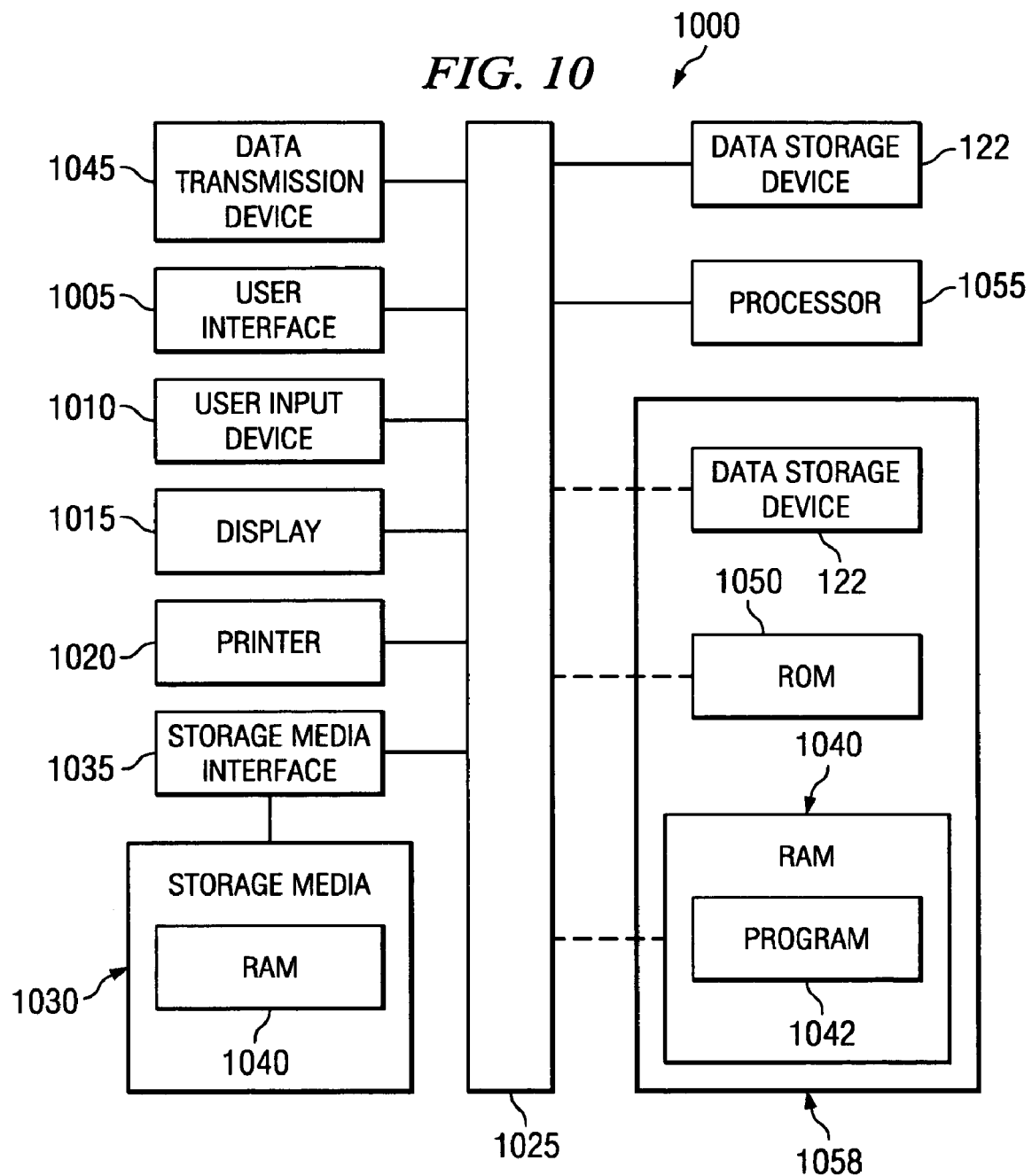

SYSTEMS, METHODS, AND COMPUTER PROGRAM PRODUCTS THAT AUTOMATICALLY DISCOVER METADATA OBJECTS AND GENERATE MULTIDIMENSIONAL MODELS

A portion of the disclosure of this patent document contains material, which is subject to copyright protection. The copyright owner has no object to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT

In U.S. patent application, Ser. No. 10/325,245 and entitled "System and Method for Automatically Building an OLAP Model in a Relational Database and incorporated herein in its entirety by this reference, there is described a system and method for automatically creating OLAP (multidimensional) metadata objects from a relational database. Further, in US Publication 2003/0212667, published Nov. 13, 2003, entitled "Systems and Methods and Computer Program Products to Browse Database Query Information", incorporated herein in its entirety by this reference, there is described a system to browse query information. Further, in US Publication 2003/0212676, published Nov. 13, 2003, entitled, "System, Methods, and Computer Program Products to Determine Useful Relationships and Dimensions of a Database", there is described a system to determine useful relationships and dimensions of a database. US Publication 2003/0212676 issued as U.S. Pat. No. 6,947,929 on Sep. 20, 2005, and a Statutory Disclaimer was filed for U.S. Pat. No. 6,947,929 on Jan. 10, 2007. Although not limited thereto, the present invention employs such methods in one of its preferred embodiments.

BACKGROUND OF THE INVENTION

1. Field of the Invention present invention is directed to the field of relational database browsing and information mining. It is more particularly directed to computer-implemented discovery of metadata, and generation of multidimensional models in a relational database.

2. Description of the Background Art

A computer-implemented database is a collection of data, organized in the form of tables. A table typically consists of columns that represent data of the same nature, and records that represent specific instances of data associated with the table. A relational database is a database that may be a set of tables containing information that is manipulated in accordance with the relational model associated with the data. For example, the product marketed under the trademarks IBM DB2 stores the data associated with the database in tables, and each table has a name. It will be appreciated that other vendors also provide relational databases.

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise through rapid access to a wide variety of data dimensions that are organized to reflect the multidimensional nature of the enterprise performance data, typically be means of hypotheses about possible trends in the data. More particularly, OLAP may be used to analyze corporate data from different viewpoints by identifying interesting associations in the information in a relational database.

Data mining is a technique employing computer-based techniques to enable users to query structured data stored in computers in forms such as, multidimensional relational databases, conventional relational databases, or flat computer files. More particularly, data mining involves extracting computer-based information and enables a user to discover trends about the computer-based information. An increasingly popular data model for OLAP applications is the multidimensional database (MDDB). MDDBs are often used by a data analyst for interactive exploration of data, such as performance data, by techniques such as data mining.

Metadata is information that describes the characteristics of stored data. For instance, data in a relational database may be described by metadata such as the name of associated relational database tables and columns. More particularly, each relational database typically has a set of tables, such as system catalog tables, which are automatically maintained by the computer system and contain information about the tables and other objects that are stored in the relational database. Information about the relational database can be retrieved from the system catalog tables using structured query language (SQL) queries.

SQL is a standardized language for defining and manipulating data in a relational database and may be used during data mining. A query may be an expression whose result is a table, and may be embodied in software structures such as a query statement or a query object. A query searches the records stored in specified tables to find the answer to a question. A query is a request for information from the relational database based on specific conditions such as, which subset of the data should be retrieved and how the data is to be presented. For example, a request for a list of all departments in a DEPARTMENT table whose budget is greater than $10,000 is an example of a query. Further, the SQL query may require analysis of the metadata associated with a relational database.

A browser may be considered a text extender function that enables a user to display text on a computer monitor. Browsing is typically used to examine records in a file, such as a relational database. By means of example, a browser may operate on one computer, such as a client computer and initiate requests to a second computer, such as a server computer so that information from the second computer may be displayed via the first computer. When a user attempts to browse information during OLAP processing, the amount of information may be so large that it is difficult to determine useful information. For example, if a user attempts to browse a relational database and uses SQL queries it may be difficult to discover OLAP trends, such as OLAP cube models, that could be used to facilitate OLAP analysis.

The product marketed under the trademarks IBM DB2 Query Management Facility (QMF) is a multipurpose query program for reporting, data sharing, server resource protection, powerful application development, and native connectivity to DB2 platforms. QMF provides an interface to build queries and business reports by accessing DB2 information, such as information provided in a DB2 catalog. QMF may operate with a browser.

The creation of MDDBs typically requires a large volume of metadata objects that are used to generate OLAP cube multidimensional models when OLAP queries are initiated. A multidimensional model may be a set of rules or a formula for predicting the most-likely data-structure outcome based on existing data. An OLAP cube multidimensional model typically comprises a set of tables that represent facts and dimensions associated with a database, providing an optimized structured presentation of metadata associated with a relational database and thereby enabling efficient mining. In the past, creation of the OLAP multidimensional cube models via the creation of metadata objects required manual, user intervention. This required a user to be extremely knowledgeable of OLAP structures such as metadata. A QMF Query Object is an example of such a metadata object and is typically used to generate a software query, such as an SQL query. Further, user-created metadata objects may be incorrect, having errors such as non-conforming or malformed structures with respect to a particular relational database structure. In the past and to overcome the problems inherent in the use of possibly incorrect user-created metadata objects, the underlying relational database tables were examined during creation of an OLAP cube multidimensional model. This in turn, required that referential integrity constraints were defined for the underlying relational database tables. Referential integrity constraints may operate to ensure that one-to-many and many-to-many relationships, between multidimensional metadata and relational database structures, are enforced within the operation of a relational database schema. Executing such referential integrity constraints requires considerable computer resources.

To overcome such problems of the past, it would be advantageous to automatically discover metadata objects during query mining and query analysis. Further, it would be useful for such automatically discovered metadata objects to conform to the relational database structure.

SUMMARY OF THE INVENTION

An embodiment of the present invention relates to systems, methods, and computer program products that include an automated discovery process that discovers useful metadata objects from an intelligent starting point thereby generating at least one multidimensional model for OLAP analysis. Further, generation of the starting point may be derived by use of a multidimensional analysis program that analyzes the results of query mining and query analysis, including at least one query object in a relational database. Such an intelligent starting point used during the OLAP discovery process aids in generating, from at least one multidimensional metadata object, useful OLAP multidimensional models for multidimensional analysis. The preferred embodiment of the present invention determines whether metadata useful for OLAP analysis exists by evaluating patterns found in the queries. The present invention advantageously addresses the need for automated discovery of such useful metadata, used to generate multidimensional (or "cube") models, when the relational database tables were not created with referential constraints. In addition to using the starting point derived from the results of query mining and query analysis, the preferred embodiment of the present invention may also limit search parameters to narrow the scope of searching for a starting point and thereby both increase the probability of producing an accurate cube multidimensional model and improve the efficiency of determining the starting point over previous techniques.

BRIEF DESCRIPTION OF THE DRAWINGS

FIG. 4A is a flow diagram that illustrates the method of the preferred embodiment of the present invention;

FIG. 4B is a flow diagram that illustrates analyzing query objects;

FIG. 4C is a flow diagram that illustrates selecting a starting point;

FIG. 5 includes FIG. 5A and FIG. 5B;

FIG. 10 is a block diagram of a computer system suitably configured for employment of the present invention.

In the following detailed description and in the several figures of the drawings, like elements are identified with like reference numerals.

DETAILED DESCRIPTION OF THE INVENTION

Figure 1:
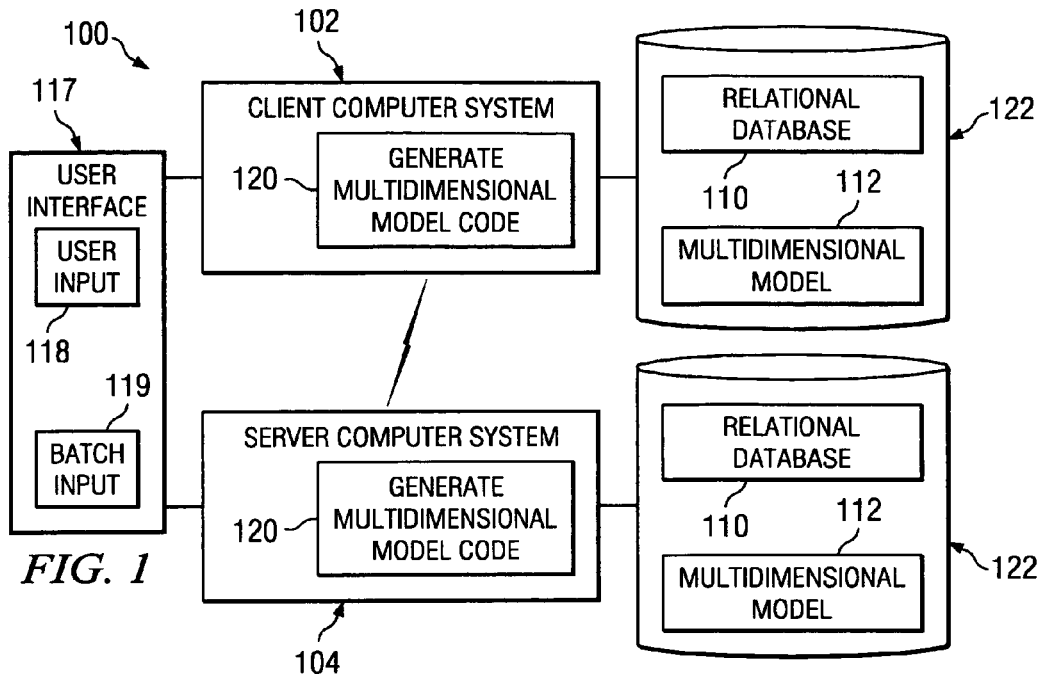
FIG. 1 is a block diagram that illustrates the computer systems that may implement the present invention.

As shown in the drawings and for purposes of illustration, an embodiment of the invention relates to systems, methods, and computer program products that automatically discover metadata objects and generate multidimensional models during query mining and query analysis. Further, according to the preferred embodiment of the present invention, the automatically discovered metadata objects and generated multidimensional models advantageously conform to the relational database structure.

In the past, relational database users frequently executed relational database queries conforming to an OLAP structure by manually creating OLAP multidimensional models that could be used to facilitate OLAP analysis. For example, the product marketed under the trademarks IBM DB2 Query Management Facility (QMF) required users to manually create metadata objects for generation of multidimensional models. Other solutions that attempt to discover metadata objects and generate multidimensional models examine the actual tables in the related relational database, and do not examine the queries. Such other solutions require referential integrity constraints to be defined in the relational database tables. These solutions are not optimal for users with large relational databases that were not originally designed for optimal OLAP analysis.

More particularly, the preferred embodiment of the present invention advantageously solves the need for automated discovery of metadata and generation of multidimensional models when the associated relational database tables were not created with referential constraints. The preferred embodiment of the present invention novelly uses the results of query mining and query analysis, such as those available with QMF, to provide intelligent options for starting the process of discovering metadata objects, including at least one fact object, at least one dimension object, and at least one join object, that are used to define optimized OLAP cube multidimensional models.

FIG. 1 is a block diagram that illustrates the computer systems that may operate with the present invention. As shown in FIG. 1 and in element 100, the preferred embodiment of the present invention may operate in a networked computer system configuration. Therefore, a client computer system 102 may communicate with a server computer system 104 during the operation of the present invention.

The Generate Multidimensional Model Code 120 operates in the client computer system 102 or the server computer system 104 to perform the present invention. For example, information may be communicated to either the server 104 or the client 102 via the user interface 117, such as an invocation to execute the Generate Multidimensional Model Code 120. According to the preferred embodiment of the present invention, the Generate Multidimensional Model Code 120 enables the relational database user to efficiently query and mine data in a relational database 110 by use of multidimensional models 112.

The user interface 117 may communicate with the preferred embodiment of the present invention, either via batch input 119 or user input 118. Further, the relational database 110 may be configured in the memory 1058 of the client 102 or the server 104. Alternatively the relational database 110 may be configured in computer storage such as that of a disk 122. Element 1058 is described with reference to FIG. 10.

Figure 2:
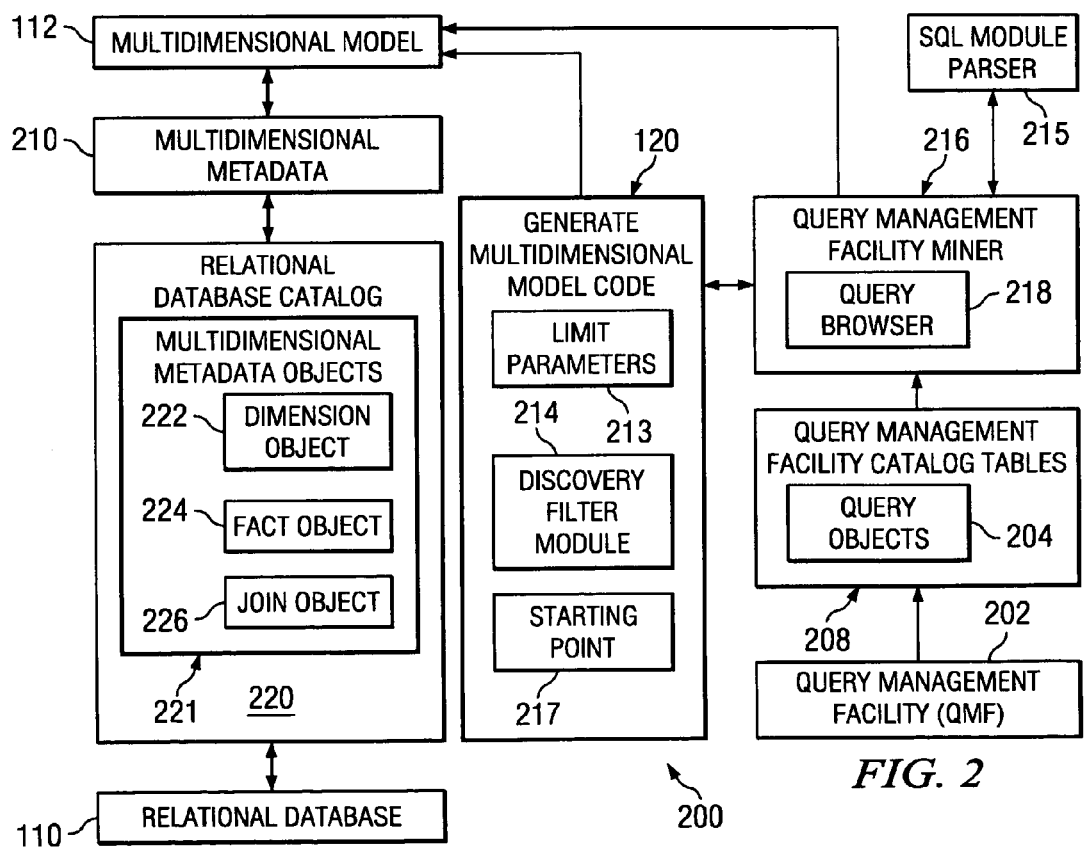
FIG. 2 is a block diagram that illustrates an embodiment of the present invention.

FIG. 2 and as shown in element 200 is a block diagram that illustrates an embodiment of the present invention. The preferred embodiment of the present invention novelly uses the results of query mining and query analysis, such as those available with QMF 202, to provide intelligent options for starting the process of discovering metadata objects that are used to define optimized OLAP Multidimensional Models 112. The intelligent starting point 217 may be derived by analysis of queries. The terms "query", "query object", and "query statement" will be used interchangeably herein. Having started with such queries, the preferred embodiment of the present invention uses limit parameters 213 and examines patterns found in the queries to determine whether useful metadata exists for generating useful multidimensional models 112.

Metadata objects are typically defined, in part, by use of information about a relational database 110 stored in a relational database catalog 220. Those skilled in the art will appreciate the operation of a relational database catalog 220. QMF 202 typically operates with a variety of objects, such as a query object 204, a form object, and a procedure object. QMF Query Objects 204 typically include SQL instructions. The preferred embodiment of the present invention advantageously uses multidimensional metadata objects 221 having at least one dimension object 222, at least one fact object 224, and at least one join object 226. Those skilled in the art will appreciate that a dimension object 222 typically includes actual data, such as names and addresses; and a fact object 224 typically includes aggregated data that is numerical. Multidimensional metadata objects 221 are typically associated with a particular multidimensional model 112 and reflect a particular view of the multidimensional metadata 210.

Those skilled in the art will appreciate that structured query language (SQL) is a standardized language for defining and manipulating data in a relational database 110. While SQL command lines are used herein by means of example it should not be viewed as limiting. Many other computer-accessible forms of program code may be used to implement embodiments of the present invention.

QMF Query Objects 204 also include a wide-variety of information in addition to the standard SQL query information, because they are stored in QMF Catalog Tables 208. For example, a QMF Query Object 204 typically contains the name of the owner of the query object 204, the type of the query object 204, and time stamp information about the last used and last modified times. This query information is novelly leveraged by the preferred embodiment of the present invention to generate Multidimensional Models 112. More particularly, at least one query object 204 is searched via the Generate Multidimensional Model Code 120, and patterns in the query information are identified that map to multidimensional metadata 210 and multidimensional metadata objects 221. Then the Generate Multidimensional Model Code 120 uses specific multidimensional metadata objects 221 to generate at least one Multidimensional Model 112 that conforms to the relational database querying and mining use pattern.

Information in the query object 204 is novelly used by an embodiment of the present invention to determine a starting point 217 and limit parameters 213 that narrow the scope of the searching and increase the probability of locating useful metadata objects 221 and thereby determining an accurate multidimensional model 112 that reflects the relational database querying and mining use patterns. Query mining may be facilitated by a feature of QMF 202, the Query Management Facility Miner (QMF Miner) 216. Query mining is based on at least one algorithm, which examines a set of query objects 204, searching for patterns, aggregations, and relationships that suggest a combination of certain groups of tables, columns, and joins to generate a multidimensional model 112. The Generate Multidimensional Model Code 120 typically includes a discovery filter 214 that makes recommendations on combinations of tables, columns, and joins of the relational database 110 that should be defined as dimensions, fact tables, or other constructs useful in discovering at least one metadata object 221 and thereby generating the multidimensional model 112.

The results of query mining may be presented to a user via a browser, such as the Query Management Facility Browser (Query Browser) 218, such as is discussed with reference to U.S. patent application, U.S. Publication 2003/0212667, entitled "Systems and Methods and Computer Program Products to Browse Database Query Information". Those skilled in the art will appreciate that a call from an SQL parser 215, typically implemented as a software code module, separates sections of an SQL statement into related information so that each section may be used to identify patterns, aggregations, and relationships of a relational database 110. The sections of an SQL statement are used by the QMF Miner 216 and by the Generate Multidimensional Model Code 120. It will be appreciated that, while the present embodiment of the invention describes a technique that advantageously works with features of QMF 202, other query management code may be used to practice the invention.

Figure 3:
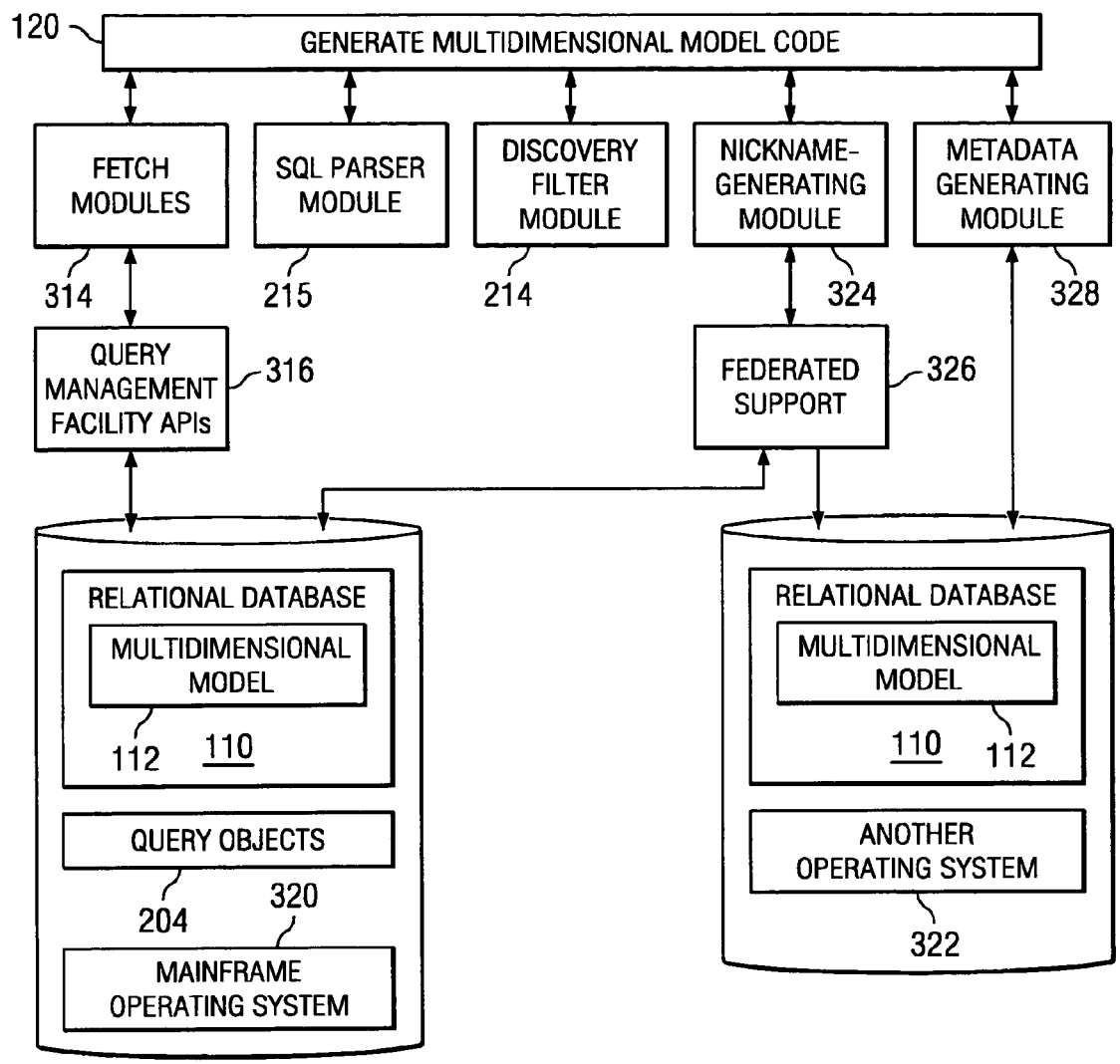
FIG. 3 is a block diagram that illustrates in detail the operation of the Generate Multidimensional Model Code.

FIG. 3 is block diagram that illustrates in detail the operation of the Generate Multidimensional Model Code 120 that creates a multidimensional model 112 associated with a relational database 110. More particularly and according to the preferred embodiment of the present invention, the Generate Multidimensional Model Code 120 and the Discovery Filter Module 214 obtain information from query objects 204 by executing a fetch module 314 that calls QMF application programming interfaces (APIs) 316. The information included in the query objects 204 is returned to the fetch module 314 so that the SQL parser 215 may identify selected portions of the information from the query objects 204.

If the information is formatted to accommodate the constraints of a particular operating system, such as a mainframe operating system 320, the nickname-generating module 324 maps information for use by another operating system 322. For example, the mainframe operating system 320 may represent the product marketed under the trademarks IBM OS/390. The nickname-generating module 324 may then use federated support 326 to map the information from the query objects 204 into a format that may be used by the another operating system 322, such as a personal-computer operating system. Then, the Generate Multidimensional Model Code 120 may use the metadata-generating module 328 to present information from the query objects 204 on a computer that operates with the another operating system 322.

Figure 4:
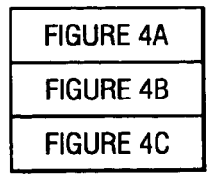
FIG. 4 includes FIG. 4A, FIG. 4B, and FIG. 4C.

FIG. 4 is a flow diagram that illustrates the method of the preferred embodiment of the present invention and that includes FIG. 4A, FIG. 4B, and FIG. 4C.

FIG. 4A illustrates the method of the preferred embodiment of the present invention. Therefore as described in element 401, query statements, such as QMF Query Objects 204, are analyzed. Moving now to FIG. 4B that illustrates in further detail the analysis of query objects 401, mining and filtering of query objects 204, as shown in element 411, is performed. There are several sources for multidimensional metadata 210 that may be retrieved by the mining of the query object 204 including: SQL parser calls and results from the operation of the discovery filter 214. Elements 204, 210, and 214 are described with reference to FIG. 2.

Those skilled in the art will appreciate that a call from an SQL parser 215 separates sections of an SQL statement into related information that is novelly used by the preferred embodiment of the present invention. A query object 204 used in the preferred embodiment of the present invention is associated with a SELECT statement and returns results. Therefore and more particularly as shown in element 401, a query object 204 is analyzed by use of calls from the SQL parser 215. The following distinct information is analyzed: at least one column that is selected in at least one SELECT clause and any aggregate functions applied to each selected column, at least one table identified in the FROM clause, any join conditions or subset join conditions specified in the WHERE clause, any grouping conditions specified in the GROUP BY clause, and the order conditions specified in the ORDER BY clause such as ASC (ascending) or DESC (descending) order conditions. Element 215 is described with reference to FIG. 2.

Further, objects and other constructs may be created to reference and count instances of the various elements included in the query object 204. In the preferred embodiment of the present invention, the process of mapping SQL constructs to multidimensional metadata 210 will adhere to the techniques described in U.S. patent application Ser. No. 10/325,245, entitled "System and Method for Automatically Building an OLAP Model in a Relational Database". For example, data in a column maps to a WHERE statement or a measure, and data from a table maps to a dimension object 222 or a fact object 224. The preferred embodiment of the present invention will operate by use of a starting point 217 and certain thresholds or limit parameters 213. The limit parameters 213 define default values or user-specified values that are used to limit the operation of the Generate Multidimensional Model Code 120 thereby efficiently identifying at least one candidate for at least one OLAP multidimensional model 112. Element 120 is described with reference to FIG. 1, and elements 213, 217, 222, and 224 are described with reference to FIG. 2.

Also, the results of the operation of the discovery filter 214 may be generated from the results produced by the QMF Miner 216 operating with at least one QMF Catalog Table 208. More particularly, when QMF 202 is installed, at least one QMF Catalog Table 208 is generated. The QMF Miner 216 interacts with the QMF Catalog Table 208 to create query objects 204. According to the method of the preferred embodiment of the present invention, discovery filters 214 operate by use of heuristics associated with user-generated relational database querying and mining. Use of such heuristics limits the information accessed in a query object 204. Elements 208 and 216 are described with reference to FIG. 2.

Such heuristics may be based on user-specified attributes of a particular filter and whether the particular filter is applied to the information in a query object 204. For example, a user can choose to analyze only queries with the schema name "Q" and all nonconforming queries would be ignored. Therefore, a user can describe attributes of a particular filter. According to the preferred embodiment of the present invention, the description of filters can greatly affect the value of the queries that are produced. Therefore and as shown in element 412, the Generate Multidimensional Model Code 120 and the discovery filter 214 match patterns associated with the query objects 204.

As an alternative embodiment of the present invention, a visual reference related to a potential join may be provided to help the user chose a starting point 217 for use by the Generate Multidimensional Model Code 120. The join information may be obtained from a WHERE clause. This representation of a join condition may be determined during the operation of the QMF Miner 216 by comparing the table associated with each paired column during the operation of a WHERE clause.

Figure 5A:
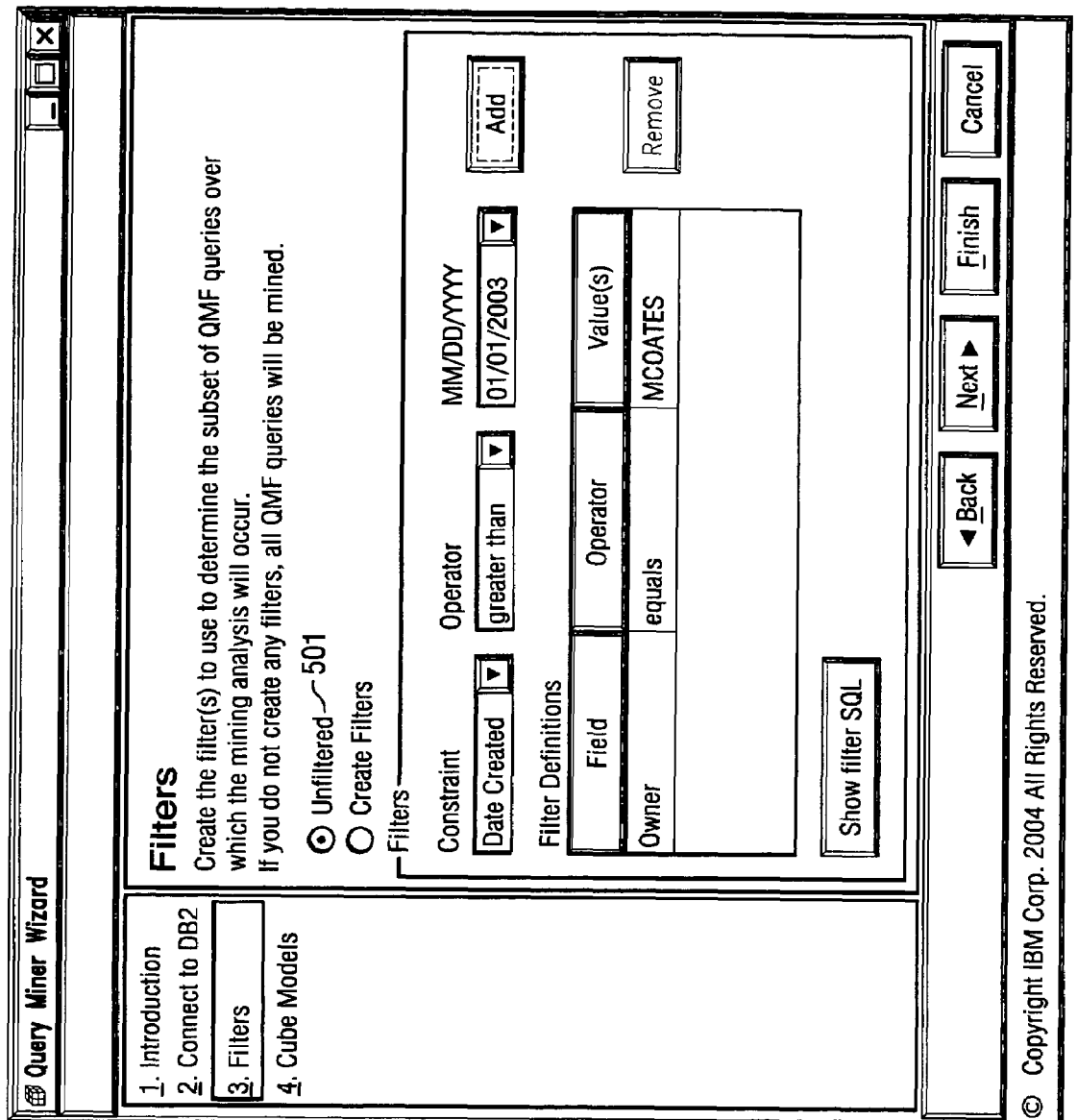
FIG. 5A illustrates an embodiment of the Filter Screen.
Figure 5B:
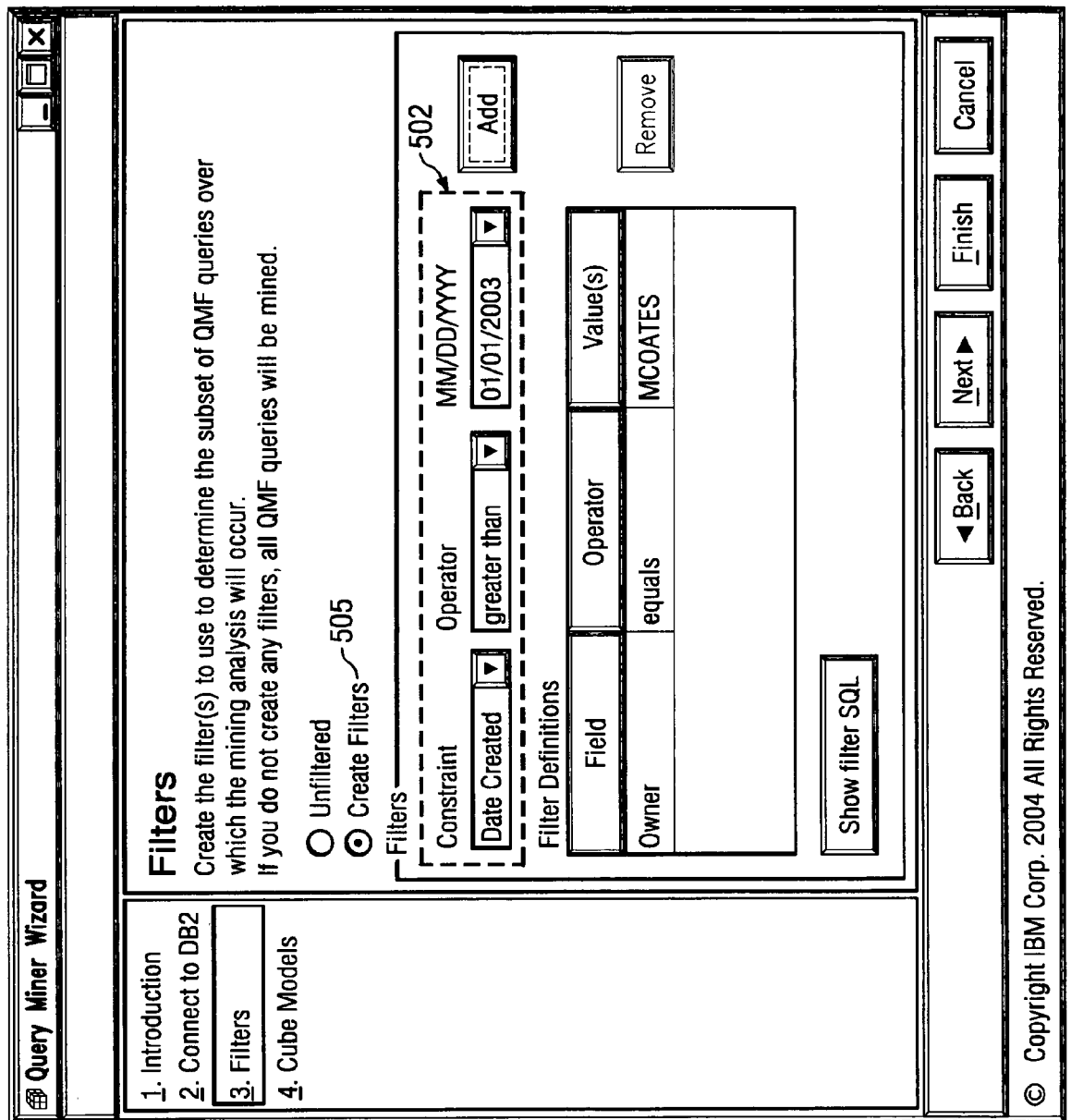
FIG. 5B illustrates an embodiment of the Creating a Filter Screen.

Turning now to FIG. 5 that includes FIG. 5A and FIG. 5B. FIG. 5A illustrates the Filter Screen 500 and the user may elect to search in an unfiltered mode 501. As shown in FIG. 5B that illustrates the Creating a Filter Screen 503 and the user may elect to search in a filtered mode 505. By means of further example, the user may identify the parameters or limits 217 used by the discovery filter 214. For example the user may identify a constraint, "Date Created" is "greater than" "Jan. 1, 2003", as shown in element 502.

Figure 6:
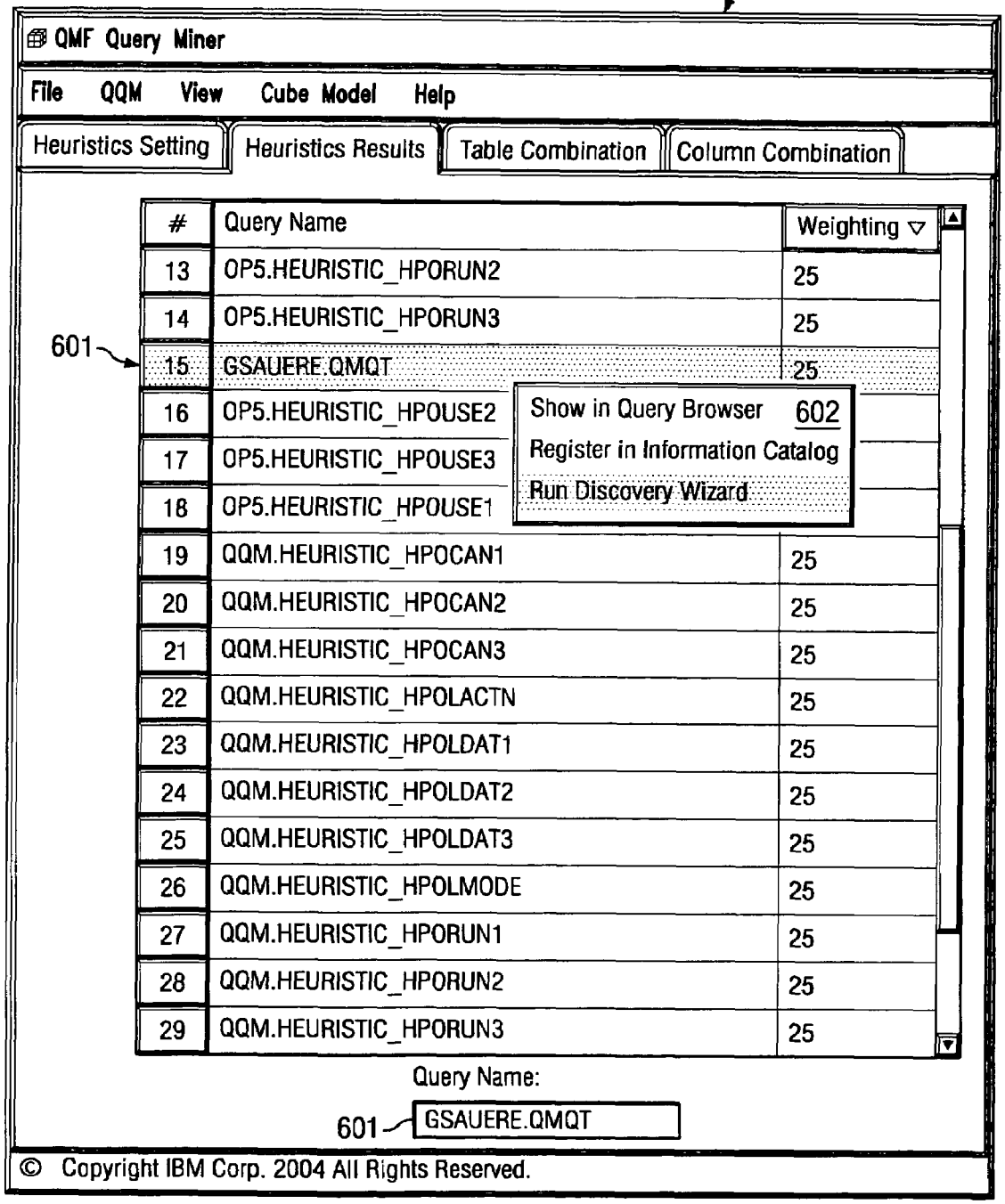
FIG. 6 illustrates an embodiment of the Generate Multidimensional Model Code including the Heuristics Filters Results Screen.

Turning now to FIG. 6 and by means of further example, according to the preferred embodiment of the present invention upon completion of the execution of the Query Browser 218 and the QMF Miner 216, the user can chose a query object, as shown in element 601 in the Heuristics Filters Results Screen 600. Such a choice will enable the user execute the Generate Multidimensional Model Code 120 by initiating the "Run Discover Wizard", as shown in element 602. The default starting point 217 selected will be the highest rated query object 204 in the result of the operation of the discovery filter 214. (The user can alternatively choose a query object 204 from the Query Browser Screen 700, as shown in FIG. 7.)

Returning to FIG. 4A and element 402, a starting point 217 is selected for generating the multidimensional model 112 from the analyzed Query Objects 204. Referring now to FIG. 4C the selecting a starting point 402 is illustrated in further detail. Due to the sheer number of multidimensional metadata objects 221 that may be uncovered, the method of the preferred embodiment of the present invention advantageously provides the user with the ability to chose a starting point 217 from which the Generate Multidimensional Model Code 120 may begin to search for useful metadata objects 221. More particularly, QMF 202 is designed to enable the selection of a starting point 217 based on user selection after execution of the Query Browser 218 and QMF Miner 216. The QMF Query Browser 218 enables queries, tables, and columns to be pivoted by allowing each to function as the root of a tree node in a pivot table. Those skilled in the art will appreciate the operation of a pivot table with respect to analyzing multidimensional metadata 210. Given that QMF Query Browser 218 identifies the tables that are referenced by a Query Object 204, this information may be used to provide a user-selected starting point 217 of either a table or a query object 204. Therefore, as shown in element 421, the starting point 217 may include at least one table associated with the relational database 110. Element 110 is described with reference to FIG. 1, and elements 202 and 218 are described with reference to FIG. 2.

Figure 7:
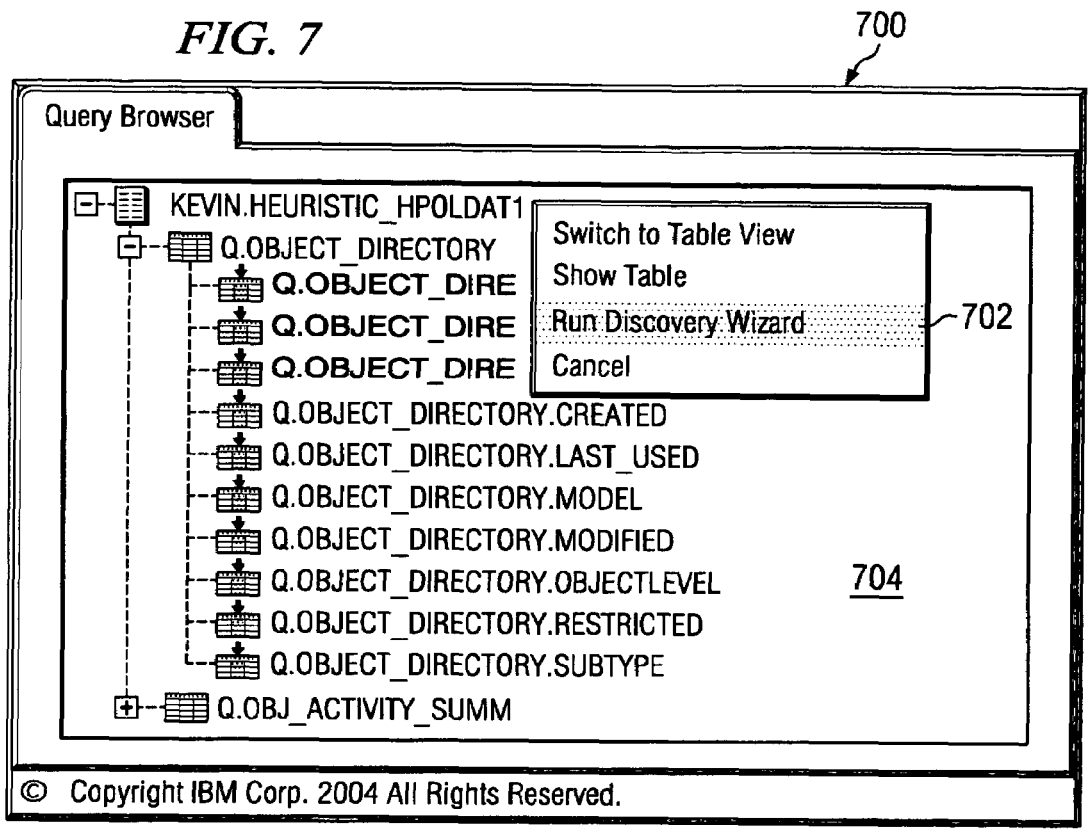
FIG. 7 illustrates an embodiment of the Generate Multidimensional Model Code including the Query Browser Screen.

Turning now to FIG. 7 and by means of further example, when starting to execute the Generate Multidimensional Model Code 120, the user can chose to switch to a table view, as shown in element 704. Alternatively, the user can chose a query object 204 and begin execution of the Discover Metadata Objects Code 120 directly from the Query Browser Screen 700 by initiating the "Run Discover Wizard" 702. When a table is the starting point 217, executing the Generate Multidimensional Model Code 120 will start from the table to discover metadata objects 221. When a query object 204 is the starting point 217, the Generate Multidimensional Model Code 120 begins with the tables referenced by the query object 204 to discover metadata objects 221. Any additional query objects 204 that reference these starting tables will be analyzed.

Returning to FIG. 4C and as shown in element 422 the starting point 217 includes at least one set of statements from at least one query object 204 and the query object 204 accesses at least one table from the relational database 110.

Returning to FIG. 4A and as shown in element 403, a maximum depth level from the starting query object 204 will be used to determine the extent of the operation of the Generate Multidimensional Model Code 120. More particularly, from either the table starting point 217 or the query object starting point 217, statistical information about potentially as many query objects 204 as are in the relational database 110 will be analyzed and recommendations will be formed as to the metadata objects 221 that should be created. During the discovery process, the potential exists for producing an indefinite, or a very large number of metadata objects 221, and creating too much data. In order to prevent this behavior and to limit the scope of the discovery of metadata objects 221, the user can also specify the maximum depth level (max_depth_level), which is defined by a join condition. For example and with respect to a table starting point 217, if the maximum depth level is ten, then the Generate Multidimensional Model Code 120 will continue for ten levels of depth (ten table joins across). When a depth of ten is reached, the Generate Multidimensional Model Code 120 will terminate the operation of looking for additional dimension objects or facts objects.

By means of further example, if a query object 204 is the starting point 217 and the maximum depth level is seven, the Generate Multidimensional Model Code 120 will continue for seven levels and across each table referenced in the starting query object 204. In this case, n*max_depth_level levels will be produced, with "n" denoting the number of tables referenced by the starting query object 204. Based upon test results, the optimal default maximum depth level will also be available for the user to select.

In a typical relational database 110 designed or utilized for OLAP, tables with a large number of measures are normally fact tables. Since the notion of a large number of measures could vary greatly by relational database 110, users will also have the ability to indicate as a limit parameter 213, the number of measures for a dimension table. Tables with measure columns above this limit will be considered fact tables. In the same manner, dimension tables will normally have less rows then fact tables in a typical OLAP environment. Since the notion of a large number of relational database rows could greatly vary by relational database 110, users will have the ability to specify a limit parameter 213 for number of rows for a dimension table. A table exceeding the row limit would be considered a fact table. Testing should provide optimal default values for these limit parameters 213.

Figure 8:
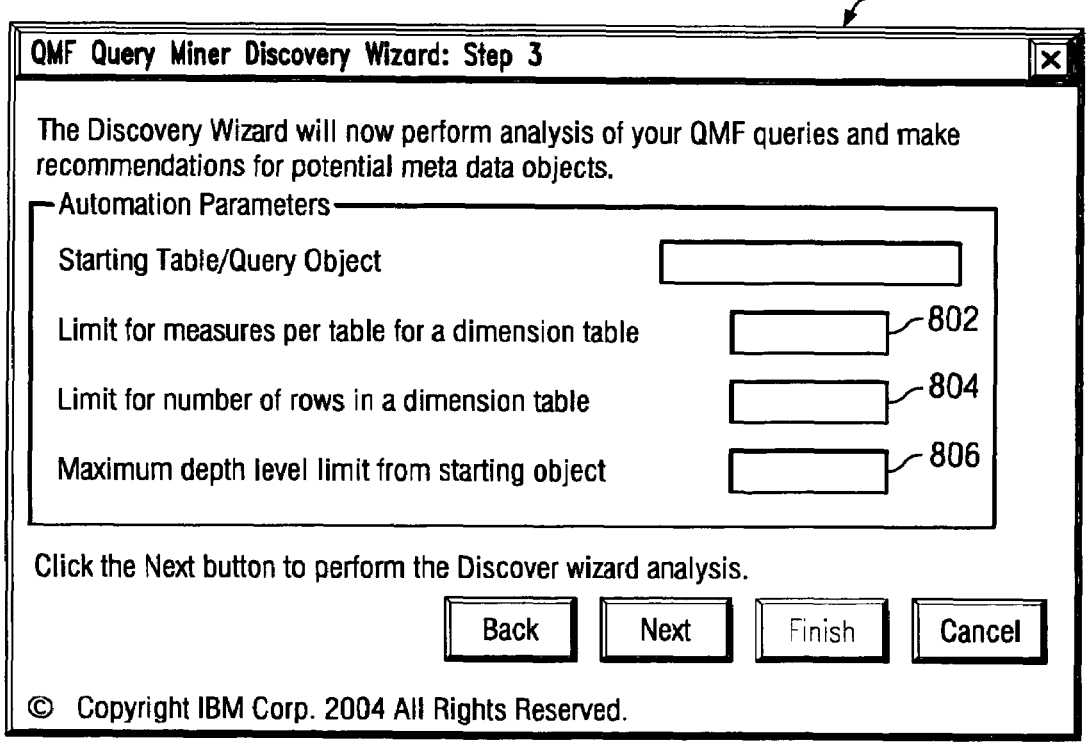
FIG. 8 illustrates an embodiment of the Generate Multidimensional Model Code including the Performing Analysis of QMF Queries Screen.

Turning now to FIG. 8 and by means of further example, the Performing Analysis of QMF Queries Screen 800 includes: limiting the measures per table in a dimensional table 802; limiting the number of rows in a dimensional table 804; and selecting the maximum depth level limit parameter 213 from the starting object 221, as shown in element 806.

Returning to FIG. 4A and as shown in element 404, metadata associated with a multidimensional model 112 is generated that is initiated at the intelligent starting point 217. As shown in element 405, a test determines whether the multidimensional metadata 210, such as a multidimensional metadata object 221, is useful. If the starting point 217 references a query object 204 which does not lead to the discovery of meaningful OLAP multidimensional models 112 after the maximum depth level has been explored, then the Generate Multidimensional Model Code 120 will attempt a second pass using the second highest rated query object 204 and a new starting point 217, as shown by the return from element 406 to element 402. In this subsequent pass, any previously followed leads, such as tables that did not produce metadata in the previous pass, will be ignored. That is in the preferred embodiment of the present invention, the Generate Multidimensional Model Code 120 retains memory of the previous pass and does not need to analyze the same constructs twice. If no useful multidimensional metadata 210 is found after the present pass in one embodiment of the present invention, it can be stated with a high degree of certainty that no useful OLAP multidimensional model 112 exists based upon the data access patterns described by the user query patterns and user mining patterns as described in the query objects 204.

Alternatively and in the method of the preferred embodiment of the present invention, if the result of the test of element 405 is "YES", then the metadata is presented to a user in a ordered list of OLAP multidimensional models 112 that are populated by the metadata in a user-chosen OLAP multidimensional model 112, as shown in element 407.

Figure 9:
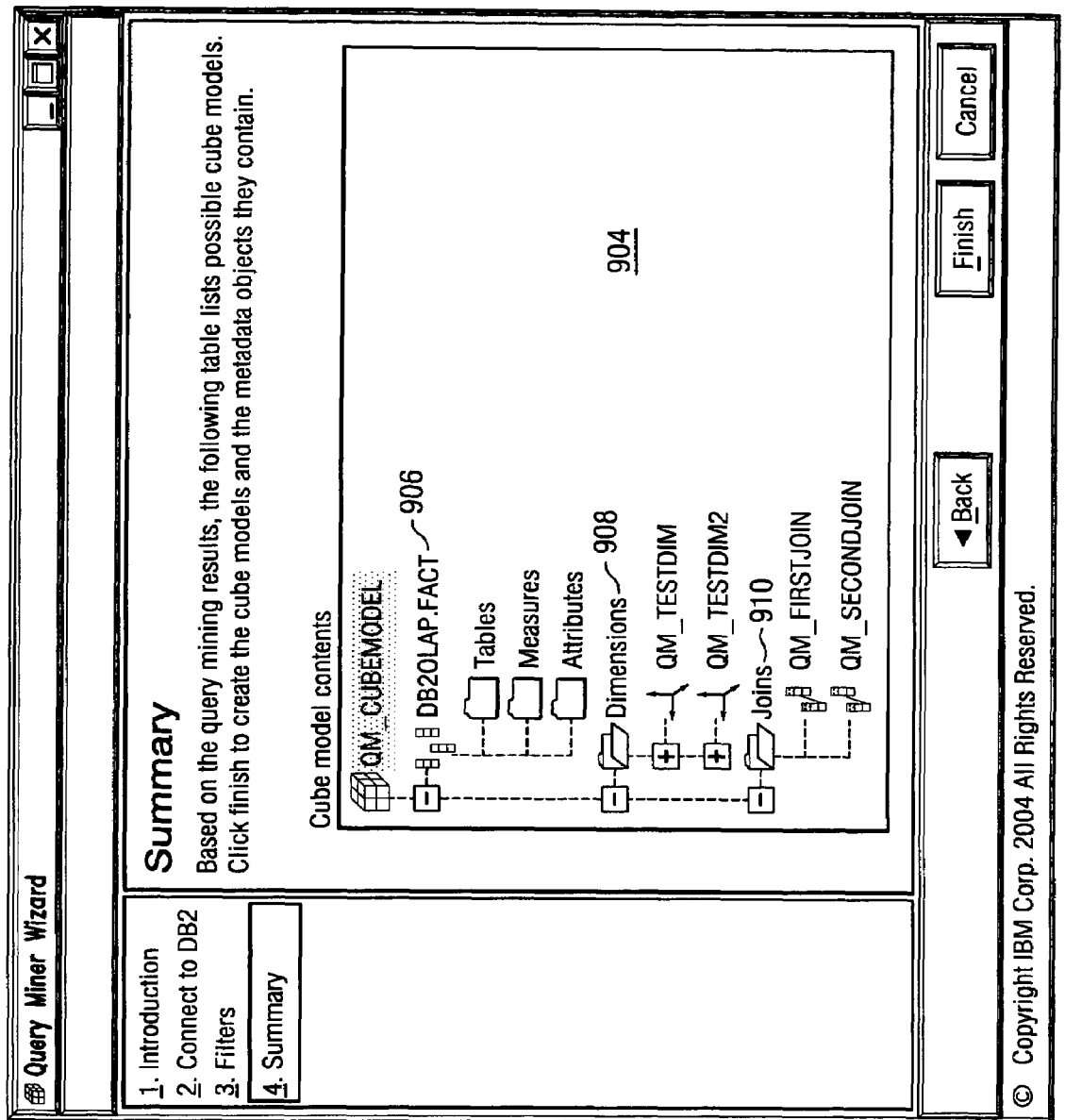
FIG. 9 illustrates an embodiment of the Generate Multidimensional Model Code including the Selecting a Multidimensional Cube Model Screen.

As shown in FIG. 9 the Selecting a Multidimensional Cube Model Screen 902 contains potential OLAP Multidimensional Models 112. When an OLAP Multidimensional Model 112 is selected, the additional metadata objects 221 will be listed in hierarchical form 904. More particularly, the Multidimensional Model 112 typically includes fact objects 224, such as DB2OLAP.FACT 906; dimension objects 222, such as Dimensions 908; and join objects 226, such as Joins 910.

FIG. 10 is a block diagram of a computer system 1000, suitable for employment of the present invention. System 1000 may be implemented on a general-purpose microcomputer, such as one of the members of the IBM Personal Computer family, or other conventional workstation or graphics computer devices. In its preferred embodiment, system 1000 includes a user interface 1005, a user input device 1010, a display 1015, a printer 1020, a processor 1055, a read only memory (ROM) 1050, a data storage device 122, such as a hard drive, a random access memory (RAM) 1040, and a storage media interface 1035, all of which are coupled to a bus 1025 or other communication means for communicating information. Although system 1000 is represented herein as a standalone system, it is not limited to such, but instead can be part of a networked system, including a wireless system. Such a wireless system may be implemented by techniques that include supporting transmission of a computer data signal in a carrier wave, the data signal having one or more instructions. The computer system 1000 may be connected locally or remotely to fixed or removable data storage devices 122 and data transmission devices 1045. For example, the server computer system 104 and the client computer system 102 also could be connected to other computer systems 1000 via the data transmission devices 1045. Elements 102 and 104 are described with reference to FIG. 1.

The RAM 1040, the data storage device 122 and the ROM 1050, are memory components 1058 that store data and instructions for controlling the operation of the processor 1055, which may be configured as a single processor or as a plurality of processors. The processor 1055 executes a program 1042, such as the Generate Multidimensional Model Code 120 to perform the methods of the present invention, as described herein. Element 120 is described with reference to FIG. 1.

While the program 1042 is indicated as loaded into the RAM 1040, it may be configured on a storage media 1030 for subsequent loading into the data storage device 122, the ROM 1050, or the RAM 1040 via an appropriate storage media interface 1035. Storage media 1030 can be any conventional storage media such as a magnetic tape, an optical storage media, a compact disk, or a floppy disk. Alternatively, storage media 1030 can be a random access memory 1040, or other type of electronic storage, located on a remote storage system.

Generally, the computer programs and operating systems are all tangibly embodied in a computer usable device or medium, such as the memory 1058, the data storage device 122, or the data transmission devices 1045, thereby making an article of manufacture, such as a computer program product, according to the invention. As such, the terms "computer program product" as used herein are intended to encompass a computer program accessible from any computer usable device or medium.

Moreover, the computer programs 1042 and operating systems are comprised of instructions which, when read and executed by the server computer system 104 and the client computer system 102, cause the server computer system 104 and the client computer system 102 to perform the steps necessary to implement and use the present invention. Under control of the operating system, the computer programs 1042 may be loaded from the memory 1058, the data storage device 122, or the data transmission devices 1045 into the memories 1058 of the server computer system 104 and the client computer system 102 for use during actual operations.

User interface 1005 is an input device, such as a keyboard or speech recognition subsystem, for enabling a user to communicate information and command selections to the processor 1055. The user can observe information generated by the system 1000 via the display 1015 or the printer 1020. The user input device 1010 is a device such as a mouse, track-ball, or joy stick that allows the user to manipulate a cursor on the display 1015 for communicating additional information and command selections to the processor 1055.

Those skilled in the art will recognize many modifications may be made to this configuration without departing from the scope of the present invention. When operating in accordance with one embodiment of the present invention, the system efficiently automates the discovery process that allows the user to select an intelligent starting point 217 for OLAP analysis by discovering at least one metadata object 221. The processor 1055 and the program 1042 collectively operate as a module, such as the Generate Multidimensional Model Code 120. It will be appreciated that the present invention offers many advantages over prior art techniques. Elements 217 and 221 are described with reference to FIG. 2.

The present invention is typically implemented using one or more computer programs, each of which executes under the control of an operating system and causes the server computer system 104 and the client computer system 102 to perform the desired operations as described herein. Thus, using the present specification, the invention may be implemented as a machine, process, method, system, or article of manufacture by using standard programming and engineering techniques to produce software, firmware, hardware or any combination thereof. Thus the article of manufacture may comprise a computer program usable medium embodying one or more instructions executable by the computer.

It will be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM, DB2, OS/390, and QMF are trademarks of International Business Machines Corporation in the United States, other countries, or both.

We claim:

1. A computer-implemented method to generate a multidimensional model, said computer including a relational database and at least one metadata object, said method comprising:

receiving, with a computer system including a processor, results of query mining and query analysis from a query management facility;

analyzing, with said computer system, said results, including at least one query object that comprises a query statement and that queries said relational database, to provide one or more starting points to discover metadata objects, wherein each of said one ore more starting points is one of a table in the relational database and a query object, wherein said analyzing includes mining said at least one query object;

in response to input from a user, selecting, with said computer system, a starting point from said one or more starting points;

discovering, with said computer system, said at least one metadata object from said starting point to a maximum depth level by making recommendations on combinations of tables, columns, and joins of said relational database that should be defined as dimension objects or fact objects, wherein the maximum depth level is provided by said user and is defined by a join condition, wherein discovering recommendations as to additional dimension objects or fact objects is terminated when the maximum depth level is reached, wherein said discovering begins with tables referenced by a query object when a starting point is said query object, wherein said discovering begins with a table when said starting point is said table, wherein said discovering includes analyzing statistical information about said starting point and forming said recommendations as to said discovered at least one metadata object from which a multidimensional model is to be created, wherein said discovered at least one metadata object includes at least one fact object, at least one dimension object, and at least one join object, wherein the discovering is a first pass, and further comprising:
  determining that the discovering did not discover meaningful dimension objects and fact objects after the maximum depth level has been reached;
  selecting a new said starting point based on said at least one analyzed query object by selecting said new starting point having a highest rating from said one or more other starting points; and
  performing, with said computer system, a second pass of discovering using said new starting point, wherein previously followed leads, including tables that did not produce metadata in the first pass, are ignored, wherein when no meaningful dimension objects and fact objects are found in the second pass, it is determined that no meaningful dimension objects and fact objects exist based upon data access patterns described by user query patterns and user mining patterns as described in the query objects; and
  generating, with said computer system, said multidimensional model from said at least one discovered metadata object, wherein said multidimensional model is represented on a screen to the user, wherein selection of the multidimensional model by the user displays metadata objects making up the multidimensional model, wherein said multidimensional model comprises an On-Line Analytical Processing (OLAP) cube multidimensional model.

2. The computer-implemented method of claim 1, wherein said at least one analyzed query object includes said at least one mined query object.

3. The computer-implemented method of claim 1, further comprising:
  receiving input from the user identifying one or more filters, wherein said analyzing includes filtering said at least one analyzed query object using the one or more filters to limit information accessed in said at least one analyzed query object.

4. The computer-implemented method of claim 3, wherein said filtering includes matching patterns associated with said at least one analyzed query object.

5. The computer-implemented method of claim 1, wherein said starting point comprises said table associated with said relational database.

6. The computer-implemented method of claim 1, wherein said selecting the starting point further comprises accessing said table from said relational database.

7. The computer-implemented method of claim 1, further comprising determining said maximum depth level from said at least one analyzed query object to limit said discovery of at least one metadata object to said maximum depth level.

8. The computer-implemented method of claim 1, wherein said generating multidimensional model comprises generating at least two said generated multidimensional models, further comprising:
  ordering said at least two generated multidimensional models; and
  presenting said ordered multidimensional models to a user.

9. A computer system to generate a multidimensional model including a relational database and at least one metadata object, the computer system comprising:
  a processor;
  memory;
  results of query mining and query analysis received, using said processor, from a query management facility;
  at least one query object that comprises a query statement and that queries said relational database to provide one or more starting points to discover metadata objects, wherein each of said one or more starting points is one of a table in the relational database and a query object, wherein said results, including at least one query object, are analyzed, and wherein said analyzing includes mining said at least one query object;
  a starting point that is selected from said one or more starting points in response to input from a user;
  said at least one metadata object that is discovered from said starting point to a maximum depth level by making recommendations on combinations of tables, columns, and joins of said relational database that should be defined as dimension objects or fact objects, wherein the maximum depth level is provided by said user and is defined by a join condition, wherein discovering recommendations as to additional dimension objects or fact objects is terminated when the maximum depth level is reached, wherein said discovering begins with tables referenced by a query object when said starting point is said query object, wherein said discovering begins with a table when said starting point is said table, wherein said discovering includes analyzing statistical information about said starting point and forming said recommendations as to said discovered at least one metadata object from which a multidimensional model is to be created, wherein said discovered at least one metadata object includes at least one fact object, at least one dimension object, and at least one join object, wherein the discovering is a first pass, and further comprising:
    determining that the discovering did not discover meaningful dimension objects and fact objects after the maximum depth level has been reached;
    selecting a new said starting point based on said at least one analyzed query object by selecting said new starting point having a highest rating from said one or more other starting points; and
    performing a second pass of discovering using said new starting point, wherein previously followed leads, including tables that did not produce metadata in the first pass, are ignored, wherein when no meaningful dimension objects and fact objects are found with the second pass, it is determined that no meaningful dimension objects and fact objects exist based upon data access patterns described by user query patterns and user mining patterns as described in the query objects; and
    generating said multidimensional model from said at least one discovered metadata object, wherein said multidimensional model is represented on a screen to the user, wherein selection of the multidimensional model by the user displays metadata objects making up the multidimensional model, wherein said multidimensional model comprises an On-Line Analytical Processing (OLAP) cube multidimensional model.

10. The computer system of claim 9, wherein said at least one analyzed query object includes said at least one mined query object.

11. The computer system of claim 9, further comprising:
  one or more filters received from input from the user, wherein said analyzing includes filtering said at least one analyzed query object using the one or more filters to limit information accessed in said at least one analyzed query object.

12. The computer system of claim 11, wherein said at least one filtered query object is obtained by matching patterns associated with said at least one analyzed query object.

13. The computer system of claim 9, wherein said starting point comprises said table associated with said relational database.

14. The computer system of claim 9, wherein said selecting the starting point further comprises accessing said table from said relational database 15. The computer system of claim 9, further comprising said maximum depth level that is determined from said at least one analyzed query object to limit said discovery of at least one metadata object to said maximum depth level.

16. The computer system of claim 9, wherein said generating multidimensional model comprises generating at least two said generated multidimensional models, further comprising:
   ordering said at least two generated multidimensional models; and
   presenting said ordered multidimensional models to a user.

17. An article of manufacture comprising a computer program usable storage medium embodying one or more instructions executable by a processor of a computer system to generate a multidimensional model, said computer system including a relational database and at least one metadata object, wherein the one or more instructions when executed on said computer system perform:
   receiving, with a computer including a processor, results of query mining and query analysis from a query management facility;
   analyzing said results, including at least one query object that comprises a query statement and that queries said relational database, to provide one or more starting points to discover metadata objects, wherein each of said one or more starting points is one of a table in the relational database and a query object, wherein said analyzing includes mining said at least one query object;
   in response to input from a user, selecting a starting point from said one or more starting points;
   discovering said at least one metadata object from said starting point to a maximum depth level by making recommendations on combinations of tables, columns, and joins of said relational database that should be defined as dimension objects or fact objects, wherein the maximum depth level is provided by said user and is defined by a join condition, wherein discovering recommendations as to additional dimension objects or fact objects is terminated when the maximum depth level is reached, wherein said discovering begins with tables referenced by a query object when said starting point is said query object, wherein said discovering begins with a table when said starting point is said table, wherein said discovering includes analyzing statistical information about said starting point and forming said recommendations as to said discovered at least one metadata object from which a multidimensional model is to be created, wherein said discovered at least one metadata object includes at least one fact object, at least one dimension object, and at least one join object, wherein the discovering is a first pass, and further comprising:
      determining that the discovering did not discover meaningful dimension objects and fact objects after the maximum depth level has been reached;
      selecting a new said starting point based on said at least one analyzed query object by selecting said new starting point having a highest rating from said one or more other starting points; and
      performing a second pass of discovering using said new starting point, wherein previously followed leads, including tables that did not produce metadata in the first pass, are ignored, wherein when no meaningful dimension objects and fact objects are found with the second pass, it is determined that no meaningful dimension objects and fact objects exist based upon data access patterns described by user query patterns and user mining patterns as described in the query objects; and
   generating said multidimensional model from said at least one discovered metadata object, wherein said multidimensional model is represented on a screen to the user, wherein selection of the multidimensional model by the user displays metadata objects making up the multidimensional model, wherein said multidimensional model comprises an On-Line Analytical Processing (OLAP) cube multidimensional model.

18. The article of manufacture of claim 17, wherein said at least one analyzed query object includes said at least one mined query object.

19. The article of manufacture of claim 17, wherein the one or more instructions when executed on said computer perform:
   receiving input from the user identifying one or more filters, wherein said analyzing includes filtering said at least one analyzed query object using the one or more filters to limit information accessed in said at least one analyzed query object.

20. The article of manufacture of claim 19, wherein the one or more instructions when executed on said computer perform:
   matching patterns associated with said at least one analyzed query object.

21. The article of manufacture of claim 17, wherein said starting point comprises said table associated with said relational database.

22. The article of manufacture of claim 17, wherein said selecting the starting point further comprises accessing said table from said relational database.

23. The article of manufacture of claim 17, wherein the one or more instructions when executed on said computer perform:
   determining said maximum depth level from said at least one analyzed query object to limit said discovery of at least one metadata object to said maximum depth level.

24. The article of manufacture of claim 17, wherein said generating multidimensional model comprises generating at least two said generated multidimensional models, and wherein the one or more instructions when executed on said computer perform:
   ordering said at least two generated multidimensional models; and
   presenting said ordered multidimensional models to a user.

* * * * *